US012585496B2

(12) United States Patent
Paris et al.

(10) Patent No.: US 12,585,496 B2
(45) Date of Patent: Mar. 24, 2026

(54) METHOD, APPARATUS AND COMPUTER PROGRAM FOR ACTIVATING A SCHEDULING CONFIGURATION

(71) Applicant: NOKIA SOLUTIONS AND NETWORKS OY, Espoo (FI)

(72) Inventors: Stefano Paris, Vanves (FR); Klaus Ingemann Pedersen, Aalborg (DK)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 442 days.

(21) Appl. No.: 18/139,065

(22) Filed: Apr. 25, 2023

(65) Prior Publication Data

US 2023/0342194 A1 Oct. 26, 2023

(30) Foreign Application Priority Data

Apr. 25, 2022 (FI) ..................................... 20225340

(51) Int. Cl.
*G06F 9/48* (2006.01)
*G06T 17/00* (2006.01)
*G06V 10/764* (2022.01)

(52) U.S. Cl.
CPC ............ *G06F 9/4881* (2013.01); *G06T 17/00* (2013.01); *G06V 10/764* (2022.01)

(58) Field of Classification Search
None
See application file for complete search history.

(56) References Cited

U.S. PATENT DOCUMENTS

| 11,510,224 B2 * | 11/2022 | Yu .......................... H04W 48/18 |
| 12,069,702 B2 * | 8/2024 | Taherzadeh Boroujeni ................ H04L 1/0007 |
| 12,245,095 B2 * | 3/2025 | Marzban ........... H04W 36/0058 |

(Continued)

FOREIGN PATENT DOCUMENTS

| EP | 2965584 B1 * | 5/2019 | ............ H04W 72/12 |

OTHER PUBLICATIONS

3GPP TS 38.321 V17.0.0 (Mar. 2022), Technical Specification, 3rd Generation Partnership Project; Technical Specification Group Radio Access Network; NR; Medium Access Control (MAC) protocol specification (Release 17), Mar. 2022.

(Continued)

*Primary Examiner* — Van H Nguyen
(74) *Attorney, Agent, or Firm* — SQUIRE PATTON BOGGS (US) LLP

(57) ABSTRACT

An apparatus performs classifying received data frames into a plurality of classes based on parameters of the received data frames, and determining a class from the plurality of classes for a next data frame based on the parameters of the previously received data frames. The determination is performed before the next data frame has arrived. A scheduling configuration is determined from a plurality of scheduling configurations based on the determined class of the next data frame. Each of the plurality of scheduling configurations comprises at least one parameter. The at least one parameter of the selected scheduling configuration is adjusted based on i) the determined class of the next data frame, and ii) information about previous communications of data frames by the network entity. The selected scheduling configuration is activated in the terminal with the at least one adjusted parameter.

14 Claims, 15 Drawing Sheets

Receiving a configuration from a network entity with a plurality of scheduling configurations, wherein each of the plurality of scheduling configurations comprises at least one parameter S1401

Receiving, from the network entity, signalling that activates a selected scheduling configuration of the plurality of scheduling configurations, with the at least one parameter that has been adjusted S1403

Changing the configuration of the selected scheduling configuration using the at least one adjusted parameter S1405

(56)          References Cited

U.S. PATENT DOCUMENTS

2005/0190771 A1      9/2005  Tan et al.
2008/0240216 A1*  10/2008  Kolding ................ H04W 52/48
                                                    375/E7.002
2013/0044592 A1      2/2013  Kim et al.

OTHER PUBLICATIONS

Extended European Search Report dated Oct. 9, 2023, correspond-
ing to European Patent Application No. 23169593.3.

* cited by examiner

200

214

213

212

211a

215

211b

S800   Classify XR traffic into classes <rate, resolution, type> according to arrival rate, size, interarrival time, jitter, etc.

S802   Learn best SPS (or CG) configuration for each class

S804   Predict class for each incoming frame according history

S806   Select and communicate best SPS (or CG) configuration

S808   Collect outcome of decision on SPS (or CG) configuration

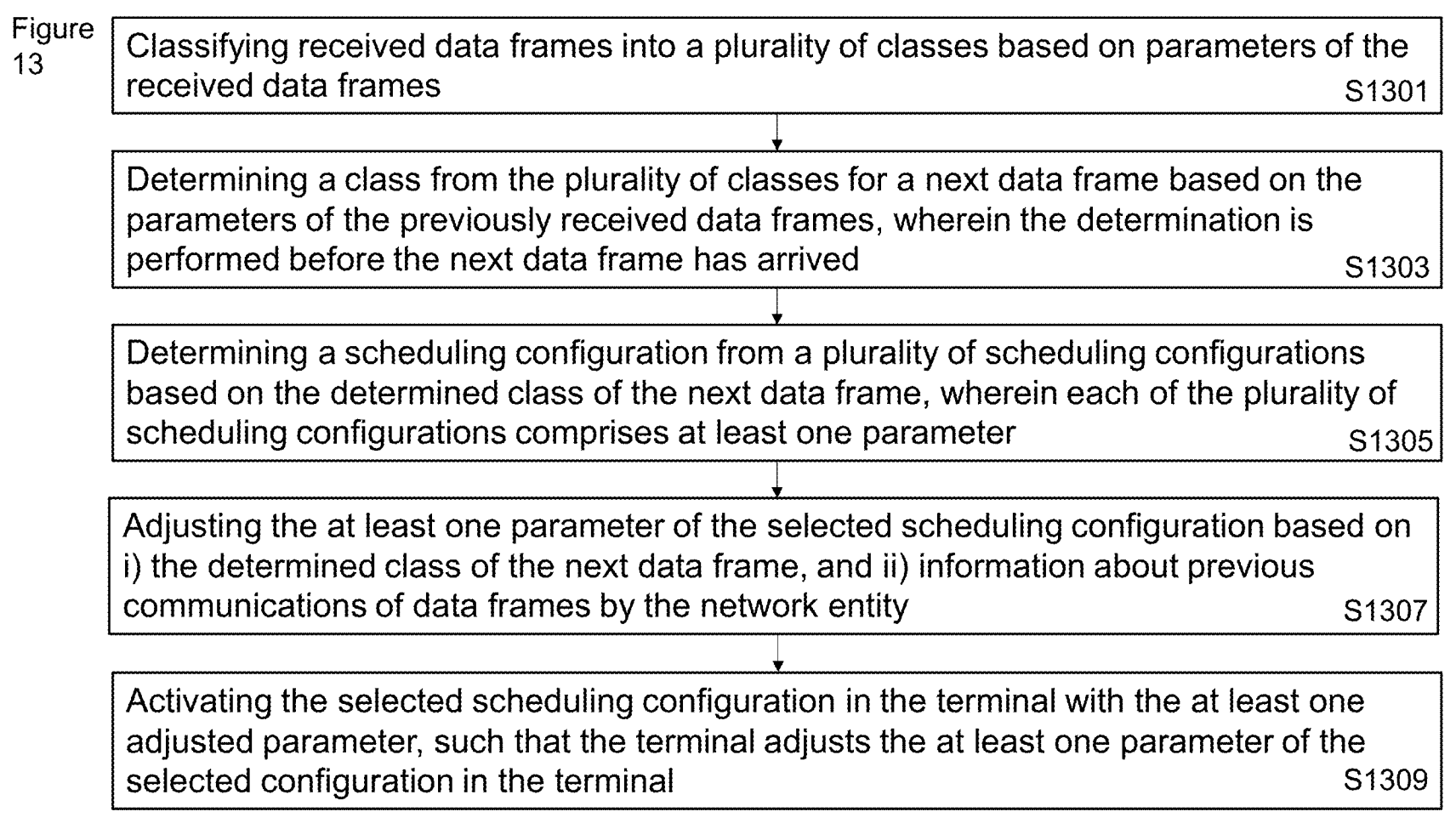

Figure
13

Classifying received data frames into a plurality of classes based on parameters of the received data frames     S1301

Determining a class from the plurality of classes for a next data frame based on the parameters of the previously received data frames, wherein the determination is performed before the next data frame has arrived     S1303

Determining a scheduling configuration from a plurality of scheduling configurations based on the determined class of the next data frame, wherein each of the plurality of scheduling configurations comprises at least one parameter     S1305

Adjusting the at least one parameter of the selected scheduling configuration based on i) the determined class of the next data frame, and ii) information about previous communications of data frames by the network entity     S1307

Activating the selected scheduling configuration in the terminal with the at least one adjusted parameter, such that the terminal adjusts the at least one parameter of the selected configuration in the terminal     S1309

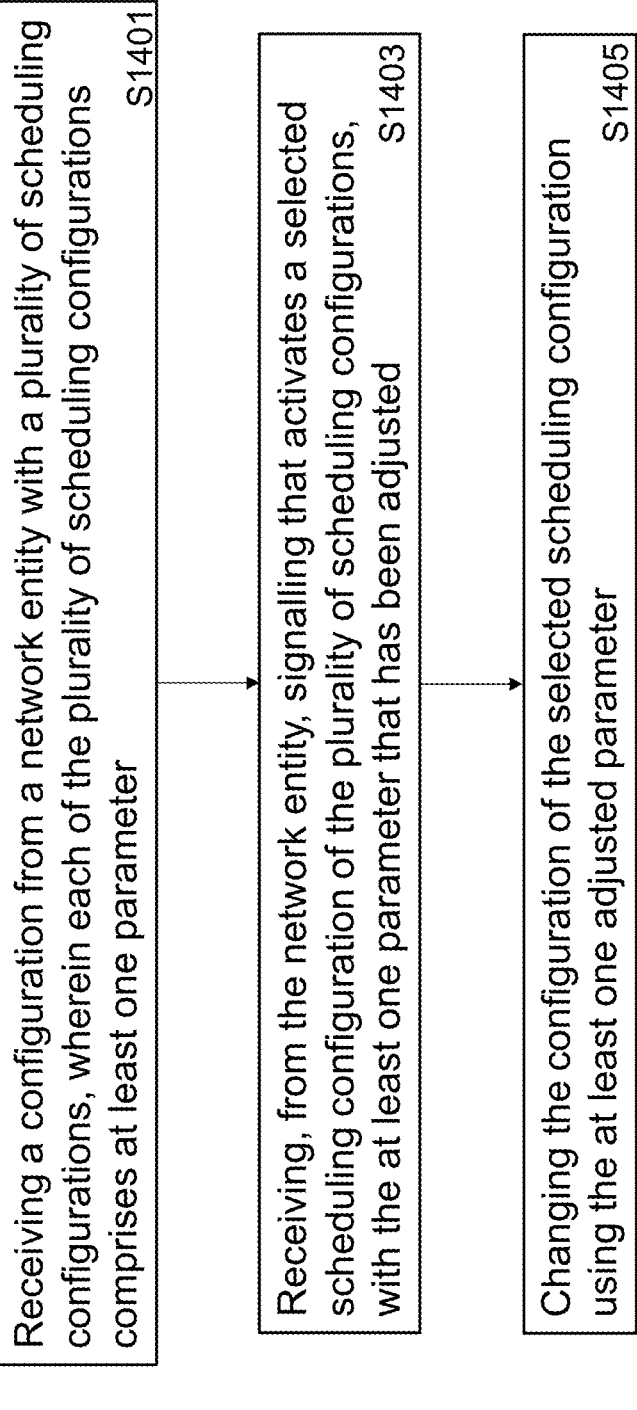

Figure 14

Receiving a configuration from a network entity with a plurality of scheduling configurations, wherein each of the plurality of scheduling configurations comprises at least one parameter          S1401

Receiving, from the network entity, signalling that activates a selected scheduling configuration of the plurality of scheduling configurations, with the at least one parameter that has been adjusted          S1403

Changing the configuration of the selected scheduling configuration using the at least one adjusted parameter          S1405

Figure 15
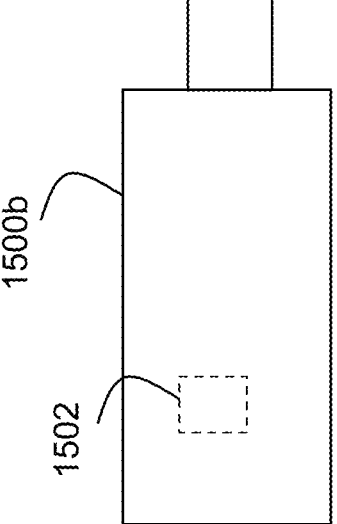
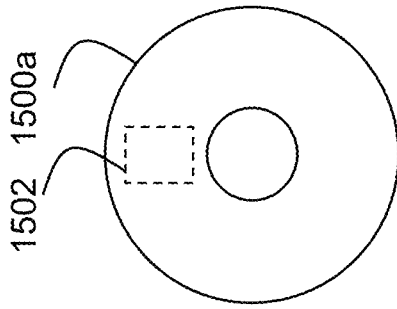

METHOD, APPARATUS AND COMPUTER PROGRAM FOR ACTIVATING A SCHEDULING CONFIGURATION

CROSS REFERENCE TO RELATED APPLICATION

This application claims priority to Finnish Application No. 20225340, filed on Apr. 25, 2022. The entire content of the above-referenced applications is hereby incorporated by reference.

FIELD

The present application relates to a method, apparatus, and computer program for a wireless communication system.

BACKGROUND

A communication system may be a facility that enables communication sessions between two or more entities such as user terminals, base stations/access points and/or other nodes by providing carriers between the various entities involved in the communications path. A communication system may be provided, for example, by means of a communication network and one or more compatible communication devices. The communication sessions may comprise, for example, communication of data for carrying communications such as voice, electronic mail (email), text message, multimedia and/or content data and so on. Non-limiting examples of services provided comprise two-way or multi-way calls, data communication or multimedia services and access to a data network system, such as the Internet.

SUMMARY

According to an aspect, there is provided an apparatus for a network entity, the apparatus comprising: means for classifying received data frames into a plurality of classes based on parameters of the received data frames; means for determining a class from the plurality of classes for a next data frame based on the parameters of the previously received data frames, wherein the determination is performed before the next data frame has arrived; means for determining a scheduling configuration from a plurality of scheduling configurations based on the determined class of the next data frame, wherein each of the plurality of scheduling configurations comprises at least one parameter; means for adjusting the at least one parameter of the selected scheduling configuration based on i) the determined class of the next data frame, and ii) information about previous communications of data frames by the network entity; and means for activating the selected scheduling configuration in the terminal with the at least one adjusted parameter, such that the terminal adjusts the at least one parameter of the selected configuration in the terminal.

In an example, the apparatus comprises means for configuring a terminal with the plurality of scheduling configurations.

In an example, the means for determining the class comprises means for receiving the class from the further network entity. In an example, the means for determining the class comprises means for selecting the class from the plurality of classes.

In an example, the information about previous communications comprises information about transmissions and/or receptions of data frames by the network entity.

In an example, the received data frames are classified into the plurality classes so that the data frames in each class have similar requirements for resource allocation, using the parameters of the received data frames.

In an example, the apparatus is comprising: means for receiving the next data frame at the network entity; and means for providing the next data frame to the terminal using allocated resources associated with the selected scheduling configuration.

In an example, the apparatus is comprising: means for receiving the next data frame, from the terminal, using allocated resources associated with the selected scheduling configuration.

In an example, the apparatus is comprising: means for receiving, from the terminal, feedback associated with the transmission or reception of the next data frame at the terminal.

In an example, the information about previous communications comprises the feedback from the terminal.

In an example, the apparatus is comprising: means for determining that the selected scheduling configuration associated with the determined class should be adjusted based on the received feedback; and means for adjusting the parameters of the selected scheduling configuration at the terminal based on the received feedback.

In an example, the means for activating the selected scheduling configuration in the terminal with the adjusted parameters comprises means for signalling the adjusted parameters to the terminal as part of the activation.

In an example, the at least one parameter is adjusted to change at least one of: a starting subframe of the resources associated with the selected scheduling configuration, a periodicity of the selected scheduling configuration, and a number of resources associated with the selected scheduling configuration.

In an example, the scheduling configuration comprises one of: a semi-persistent scheduling configuration, and a configured-grant configuration.

In an example, the apparatus is comprising: means for associating each of the plurality of classes with a scheduling configuration of the plurality of scheduling configurations.

In an example, the means for classifying comprises at least one first machine learning model, which when executed, is configured to determine the plurality of classes based on at least one of: a frame rate, a resolution, and a frame type, of the received data frames.

In an example, the means for determining comprises at least one second machine learning model, which when executed, is configured to determine the class of the next data frame based on at least one of: arrival rate, frame size distribution, and interarrival time, of the previously received data frames.

In an example, the means for selecting comprises at least one third machine learning model, which when executed, is configured to select the scheduling configuration of the plurality of scheduling configurations based on the determined class of the next data frame.

In an example, the scheduling configuration is selected so that the scheduling configuration fulfils at least one quality of service criteria associated with extended reality data frames.

In an example, the at least one quality of service criteria comprises at least one of: packet delay budget, and packet error rate.

In an example, the parameters are adjusted via layer 1, or layer 2 signalling.

In an example, the parameters are adjusted downlink control information signalling. In an example, the parameters are adjusted via a medium access control control element.

In an example, the apparatus is comprising: means for providing, to the terminal, a plurality of indication delay budgets, each indication delay budget indicating a maximum validity timer for feedback on an outcome of the selected scheduling configuration, being used by the terminal, according to a scheduling criteria to be provided by the terminal to the network entity.

In an example, a selected indication delay budget of the plurality of indication delay budgets is activated in the terminal, by the network entity, in the same signalling that the scheduling configuration is activated in.

In an example, the apparatus is comprising: means for determining first parameters associated with the next data frame; and means for using the first parameters to train the at least one second machine learning model.

In an example, the received feedback is used to train the at least one third machine learning model.

In an example, the apparatus comprising: means for, when the feedback is received at the network entity, after the indication delay budget timer has expired. dismissing the received feedback received from the terminal.

In an example, the apparatus is comprising: means for determining a missing data frame at the network entity; and means for providing a timing offset, to the terminal, to change the starting subframe of a next set of resources associated with the selected scheduling configuration.

In an example, the selected scheduling configuration is a periodic configuration, wherein resources are provided, for the terminal to use, in a periodic manner.

According to an aspect, there is provided an apparatus for a terminal, the apparatus comprising: means for receiving a configuration from a network entity with a plurality of scheduling configurations, wherein each of the plurality of scheduling configurations comprise parameters that are adjustable; means for receiving, from the network entity, signalling that activates a selected scheduling configuration of the plurality of scheduling configurations, with adjusted parameters; and means for changing the configuration of the selected scheduling configuration using the adjusted parameters.

In an example, the apparatus is comprising: means for receiving a first data frame from the network entity, using resources allocated for the selected scheduling configuration.

In an example, the apparatus is comprising: means for transmitting a first data frame to the network entity, using resources allocated for the selected scheduling configuration.

In an example, the apparatus is comprising: means for transmitting, to the network entity, feedback associated with the reception or transmission of the next data frame using the resources associated with the selected scheduling configuration.

In an example, the parameters are adjusted to change at least one of: a starting subframe of the resources associated with the selected scheduling configuration, a periodicity of the selected scheduling configuration, and a number of resources associated with the selected scheduling configuration.

In an example, the scheduling configuration comprises one of: a semi-persistent scheduling configuration, and a configured-grant configuration.

According to an aspect, there is provided a method performed by a network entity, the method comprising: classifying received data frames into a plurality of classes based on parameters of the received data frames; determining a class from the plurality of classes for a next data frame based on the parameters of the previously received data frames, wherein the determination is performed before the next data frame has arrived; determining a scheduling configuration from a plurality of scheduling configurations based on the determined class of the next data frame, wherein each of the plurality of scheduling configurations comprises at least one parameter; adjusting the at least one parameter of the selected scheduling configuration based on i) the determined class of the next data frame, and ii) information about previous communications of data frames by the network entity; and activating the selected scheduling configuration in the terminal with the at least one adjusted parameter, such that the terminal adjusts the at least one parameter of the selected configuration in the terminal.

In an example, the received data frames are classified into the plurality classes so that the data frames in each class have similar requirements for resource allocation, using the parameters of the received data frames.

In an example, the method comprises: receiving the first data frame at the network entity; and providing the next data frame to the terminal using allocated resources associated with the selected scheduling configuration.

In an example, the method comprises: receiving, from the terminal, feedback associated with the reception of the next data frame at the terminal using the resources associated with the selected scheduling configuration.

In an example, the method comprises: determining that the selected scheduling configuration associated with the determined class should be adjusted based on the received feedback; and adjusting the parameters of the selected scheduling configuration at the terminal based on the received feedback.

In an example, the at least one parameters is adjusted to change at least one of: a starting subframe of the resources associated with the selected scheduling configuration, a periodicity of the selected scheduling configuration, and a number of resources associated with the selected scheduling configuration.

In an example, the scheduling configuration comprises one of: a semi-persistent scheduling configuration, and a configured-grant configuration.

In an example, the method comprises: associating each of the plurality of classes with a scheduling configuration of the plurality of scheduling configurations.

In an example, the classifying is performed by at least one first machine learning model of the network entity, the method comprising determining the plurality of classes based on at least one of: a frame rate, a resolution, and a frame type, of the received data frames.

In an example, the determining is performed by at least one second machine learning model of the network entity, the method comprising determining the class of the next data frame based on at least one of: arrival rate, frame size distribution, and interarrival time, of the previously received data frames.

In an example, the selecting is performed by at least one third machine learning model of the network entity, the method comprising selecting the scheduling configuration of the plurality of scheduling configurations based on the determined class of the next data frame.

In an example, the scheduling configuration is selected so that the scheduling configuration fulfils at least one quality of service criteria associated with extended reality data frames.

In an example, the at least one quality of service criteria comprises at least one of: packet delay budget, and packet error rate.

In an example, the parameters are adjusted via layer 1, or layer 2 signalling.

In an example, the method comprises: providing, to the terminal, a plurality of indication delay budgets, each indication delay budget indicating a maximum validity timer for feedback on an outcome of the selected scheduling configuration, being used by the terminal, according to a scheduling criteria to be provided by the terminal to the network entity.

In an example, a selected indication delay budget of the plurality of indication delay budgets is activated in the terminal, by the network entity, in the same signalling that the scheduling configuration is activated in.

In an example, the method comprises: determining first parameters associated with the next data frame; and using the first parameters to train the at least one second machine learning model.

In an example, the received feedback is used to train the at least one third machine learning model.

In an example, the method comprises: when the feedback is received at the network entity, after the indication delay budget timer has expired, dismissing the received feedback received from the terminal.

In an example, the method comprises: determining a missing data frame at the network entity; and providing a timing offset, to the terminal, to change the starting subframe of a next set of resources associated with the selected scheduling configuration.

According to an aspect, there is provided a method performed by a terminal, the method comprising: receiving a configuration from a network entity with a plurality of scheduling configurations, wherein each of the plurality of scheduling configurations comprises at least one parameter; receiving, from the network entity, signalling that activates a selected scheduling configuration of the plurality of scheduling configurations, with the at least one parameter that has been adjusted; and changing the configuration of the selected scheduling configuration using the at least one adjusted parameter.

In an example, the method comprises: receiving a first data frame from the network entity, using resources allocated for the selected scheduling configuration.

In an example, the method comprises: transmitting a first data frame to the network entity, using resources allocated for the selected scheduling configuration.

In an example, the method comprises: transmitting, to the network entity, feedback associated with reception or transmission of the next data frame using the resources associated with the selected scheduling configuration.

In an example, the at least one parameter is adjusted to change at least one of: a starting subframe of the resources associated with the selected scheduling configuration, a periodicity of the selected scheduling configuration, and a number of resources associated with the selected scheduling configuration.

According to an aspect, there is provided an apparatus comprising: one or more processors, and memory storing instructions that, when executed by the one or more processors, cause the apparatus to perform: classifying received data frames into a plurality of classes based on parameters of the received data frames; determining a class from the plurality of classes for a next data frame based on the parameters of the previously received data frames, wherein the determination is performed before the next data frame has arrived; determining a scheduling configuration from a plurality of scheduling configurations based on the determined class of the next data frame, wherein each of the plurality of scheduling configurations comprises at least one parameter; adjusting the at least one parameter of the selected scheduling configuration based on i) the determined class of the next data frame, and ii) information about previous communications of data frames by the network entity; and activating the selected scheduling configuration in the terminal with the at least one adjusted parameter, such that the terminal adjusts the at least one parameter of the selected configuration in the terminal.

In an example, the received data frames are classified into the plurality classes so that the data frames in each class have similar requirements for resource allocation, using the parameters of the received data frames.

In an example, the apparatus is caused to perform: receiving the first data frame at the network entity; and providing the next data frame to the terminal using allocated resources associated with the selected scheduling configuration.

In an example, the apparatus is caused to perform: receiving, from the terminal, feedback associated with the reception of the next data frame at the terminal using the resources associated with the selected scheduling configuration.

In an example, the apparatus is caused to perform: determining that the selected scheduling configuration associated with the determined class should be adjusted based on the received feedback; and adjusting the parameters of the selected scheduling configuration at the terminal based on the received feedback.

In an example, the at least one parameter is adjusted to change at least one of: a starting subframe of the resources associated with the selected scheduling configuration, a periodicity of the selected scheduling configuration, and a number of resources associated with the selected scheduling configuration.

In an example, the scheduling configuration comprises one of: a semi-persistent scheduling configuration, and a configured-grant configuration.

In an example, the apparatus is caused to perform: associating each of the plurality of classes with a scheduling configuration of the plurality of scheduling configurations.

In an example, the classifying is performed by at least one first machine learning model of the network entity, the method comprising determining the plurality of classes based on at least one of: a frame rate, a resolution, and a frame type, of the received data frames.

In an example, the determining is performed by at least one second machine learning model of the network entity, the method comprising determining the class of the next data frame based on at least one of: arrival rate, frame size distribution, and interarrival time, of the previously received data frames.

In an example, the selecting is performed by at least one third machine learning model of the network entity, the method comprising selecting the scheduling configuration of the plurality of scheduling configurations based on the determined class of the next data frame.

In an example, the scheduling configuration is selected so that the scheduling configuration fulfils at least one quality of service criteria associated with extended reality data frames.

In an example, the at least one quality of service criteria comprises at least one of: packet delay budget, and packet error rate.

In an example, the parameters are adjusted via layer 1, or layer 2 signalling.

In an example, the apparatus is caused to perform: providing, to the terminal, a plurality of indication delay budgets, each indication delay budget indicating a maximum validity timer for feedback on an outcome of the selected scheduling configuration, being used by the terminal, according to a scheduling criteria to be provided by the terminal to the network entity.

In an example, a selected indication delay budget of the plurality of indication delay budgets is activated in the terminal, by the network entity, in the same signalling that the scheduling configuration is activated in.

In an example, the apparatus is caused to perform: determining first parameters associated with the next data frame; and using the first parameters to train the at least one second machine learning model.

In an example, the received feedback is used to train the at least one third machine learning model.

In an example, the apparatus is caused to perform: when the feedback is received at the network entity, after the indication delay budget timer has expired, dismissing the received feedback received from the terminal.

In an example, the apparatus is caused to perform: determining a missing data frame at the network entity; and providing a timing offset, to the terminal, to change the starting subframe of a next set of resources associated with the selected scheduling configuration.

According to an aspect, there is provided an apparatus comprising: one or more processors, and memory storing instructions that, when executed by the one or more processors, cause the apparatus to perform: receiving a configuration from a network entity with a plurality of scheduling configurations, wherein each of the plurality of scheduling configurations comprises at least one parameter; receiving, from the network entity, signalling that activates a selected scheduling configuration of the plurality of scheduling configurations, with the at least one parameter that has been adjusted; and changing the configuration of the selected scheduling configuration using the at least one adjusted parameter.

In an example, the apparatus is caused to perform: receiving a first data frame from the network entity, using resources allocated for the selected scheduling configuration.

In an example, the apparatus is caused to perform: transmitting a first data frame to the network entity, using resources allocated for the selected scheduling configuration.

In an example, the apparatus is caused to perform: transmitting, to the network entity, feedback associated with reception or transmission of the next data frame using resources associated with the selected scheduling configuration.

In an example, the at least one parameter is adjusted to change at least one of: a starting subframe of the resources associated with the selected scheduling configuration, a periodicity of the selected scheduling configuration, and a number of resources associated with the selected scheduling configuration.

According to an aspect, there is provided a computer program comprising computer executable instructions which when run on one or more processors perform: classifying received data frames into a plurality of classes based on parameters of the received data frames; determining a class from the plurality of classes for a next data frame based on the parameters of the previously received data frames, wherein the determination is performed before the next data frame has arrived; determining a scheduling configuration from a plurality of scheduling configurations based on the determined class of the next data frame, wherein each of the plurality of scheduling configurations comprises at least one parameter; adjusting the at least one parameter of the selected scheduling configuration based on i) the determined class of the next data frame, and ii) information about previous communications of data frames by the network entity; and activating the selected scheduling configuration in the terminal with the at least one adjusted parameter, such that the terminal adjusts the at least one parameter of the selected configuration in the terminal.

According to an aspect, there is provided a computer program comprising computer executable instructions which when run on one or more processors perform: receiving a configuration from a network entity with a plurality of scheduling configurations, wherein each of the plurality of scheduling configurations comprises at least one parameter; receiving, from the network entity, signalling that activates a selected scheduling configuration of the plurality of scheduling configurations, with the at least one parameter that has been adjusted; and changing the configuration of the selected scheduling configuration using the at least one adjusted parameter.

A computer product stored on a medium may cause an apparatus to perform the methods as described herein.

An electronic device may comprise apparatus as described herein.

In the above, various aspects have been described. It should be appreciated that further aspects may be provided by the combination of any two or more of the various aspects described above.

Various other aspects and further embodiments are also described in the following detailed description and in the attached claims.

According to some aspects, there is provided the subject matter of the independent claims. Some further aspects are defined in the dependent claims. The embodiments that do not fall under the scope of the claims are to be interpreted as examples useful for understanding the disclosure.

List of Abbreviations

AF: Application Function
AMF: Access Management Function
AN: Access Network
APN: Access Point Name
AR: Augmented Reality
BS: Base Station
CN: Core Network
CE: Control Element
CG: Configured Grant
DCI: Downlink Control Information
DL: Downlink
DN: Data Network
eNB: eNodeB
FPS: Frames-per-Second
gNB: gNodeB
GOP: Group of Pictures
IE: Information Element
IP: Internet Protocol
LTE: Long Term Evolution
NEF: Network Exposure Function NG-RAN: Next Generation Radio Access Network
NF: Network Function
NR: New Radio
NRF: Network Repository Function
NW: Network
MAC: Medium Access Control
ML: Machine Learning
MS: Mobile Station
NN: Neural Network
PCFPolicy Control Function
PDU: Protocol Data Unit
PDCCH: Physical Downlink Control Channel
PDSCH: Physical Downlink Shared Channel
QoE: Quality of Experience
QoS: Quality of Service
RAN: Radio Access Network
RF: Radio Frequency
RRC: Radio Resource Control
SCS: Subcarrier Spacing
SM: Session Management
SPS: Semi-Persistent Scheduling
SMF: Session Management Function
UE: User Equipment
UDR: Unified Data Repository
UDM: Unified Data Management
UL: Uplink
UPF: User Plane Function
VR: Virtual Reality
XR: Extended Reality
3GPP: $3^{rd}$ Generation Partnership Project
5G: $5^{th}$ Generation
5GC: 5G Core network
5G-AN: 5G Radio Access Network
5GS: 5G System
5G SM: 5G Session Management

DESCRIPTION OF FIGURES

Embodiments will now be described, by way of example only, with reference to the accompanying Figures in which:
FIG. 13 shows another example method flow diagram performed by a network entity;

FIG. 14 shows another example method flow diagram performed by a terminal; and
FIG. 15 shows a schematic representation of a non-volatile memory medium storing instructions which when executed by a processor allow a processor to perform one or more of the steps of the method of FIGS. 13 and 14.

DETAILED DESCRIPTION

Before explaining in detail some examples of the present disclosure, certain general principles of a wireless communication system and mobile communication devices are briefly explained with reference to FIGS. 1 to 3 to assist in understanding the technology underlying the described examples.

Figure 1:
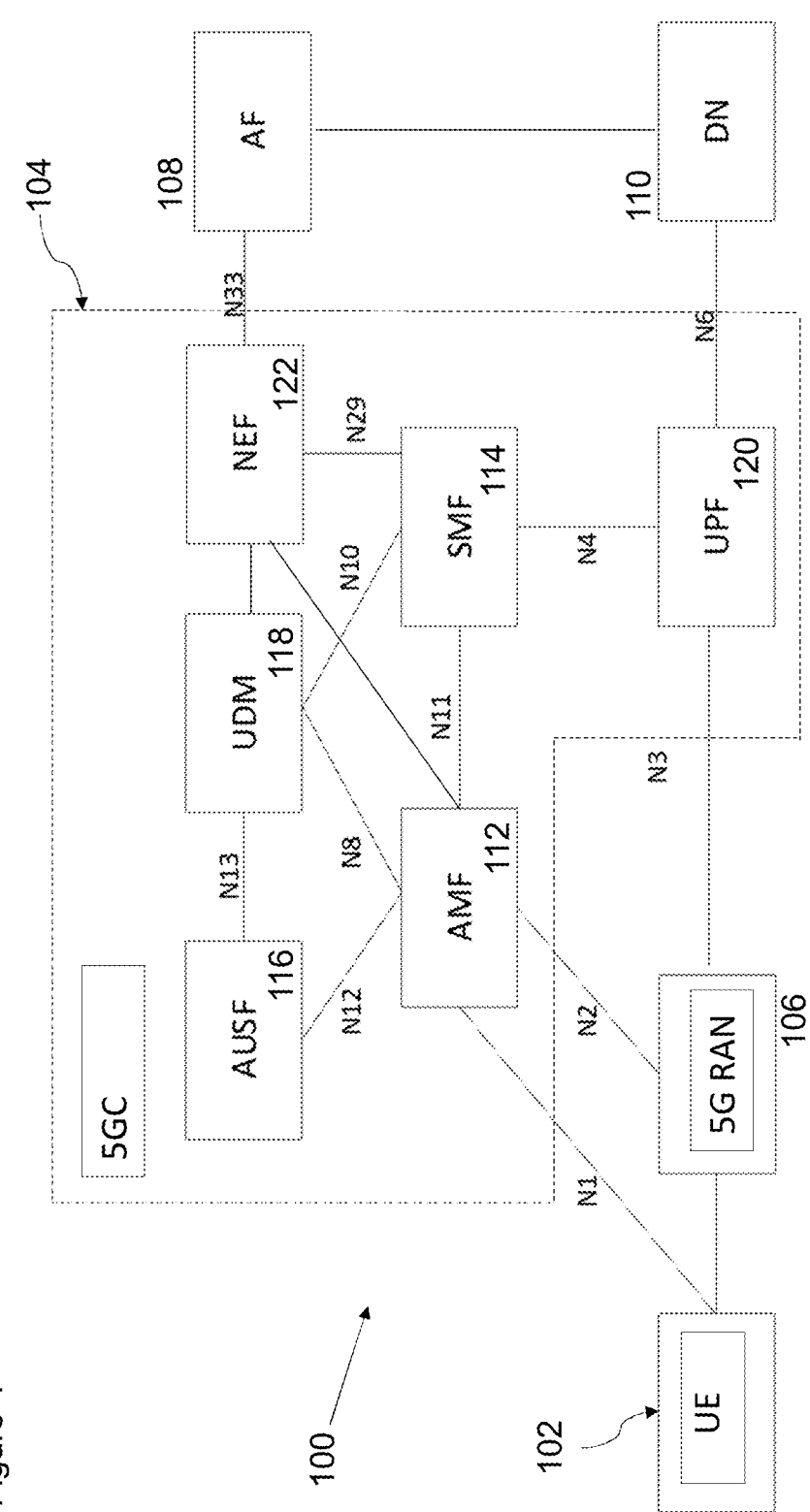
FIG. 1 shows a schematic representation of a 5G system.

In a wireless communication system 100, such as that shown in FIG. 1, mobile communication devices/terminals or user apparatuses, and/or user equipments (UE), and/or machine-type communication devices 102 are provided wireless access via at least one base station (not shown) or similar wireless transmitting and/or receiving node or point. A communication device is provided with an appropriate signal receiving and transmitting apparatus for enabling communications, for example enabling access to a communication network or communications directly with other devices. The communication device may access a carrier provided by a station or access point, and transmit and/or receive communications on the carrier.

In the following certain examples are explained with reference to mobile communication devices capable of communication via a wireless cellular system and mobile communication systems serving such mobile communication devices. Before explaining in detail the examples of disclose, certain general principles of a wireless communication system, access systems thereof, and mobile communication devices are briefly explained with reference to FIGS. 1, 2 and 3 to assist in understanding the technology underlying the described examples.

FIG. 1 shows a schematic representation of a 5G system (5GS) 100. The 5GS may comprises a device 102 such as user equipment or terminal, a 5G access network (5G-AN) 106, a 5G core network (5GC) 104, one or more network functions (NF), one or more application function (AF) 108 and one or more data networks (DN) 110.

The 5G-RAN 106 may comprise one or more gNodeB (gNB) distributed unit functions connected to one or more gNodeB (gNB) centralized unit functions.

The 5GC 104 may comprise an access management function (AMF) 112, a session management function (SMF) 114, an authentication server function (AUSF) 116, a user data management (UDM) 118, a user plane function (UPF) 120, a network exposure function (NEF) 122 and/or other NFs. Some of the examples as shown below may be applicable to 3GPP 5G standards. However, some examples may also be applicable to 4G, 3G and other 3GPP standards.

In a communication system, such as that shown in FIG. 1, mobile communication devices/terminals or user apparatuses, and/or user equipments (UE), and/or machine-type communication devices are provided with wireless access via at least one base station or similar wireless transmitting and/or receiving node or point. The terminal is provided with an appropriate signal receiving and transmitting apparatus for enabling communications, for example enabling access to a communication network or communications directly with other devices. The communication device may access a carrier provided by a station or access point, and transmit and/or receive communications on the carrier.

Figure 2:
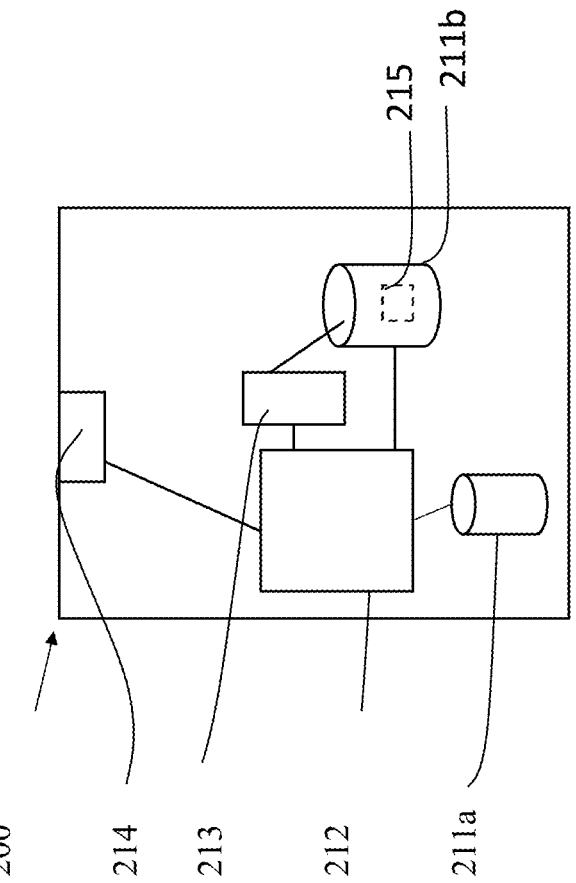
FIG. 2 shows a schematic representation of a control apparatus.

FIG. 2 illustrates an example of a control apparatus 200 for controlling a function of the 5G-AN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5G-AN or the 5GC. In some examples, each function of the 5G-AN or the 5GC comprises a control apparatus 200. In alternative examples, two or more functions of the 5G-AN or the 5GC may share a control apparatus.

Figure 3:
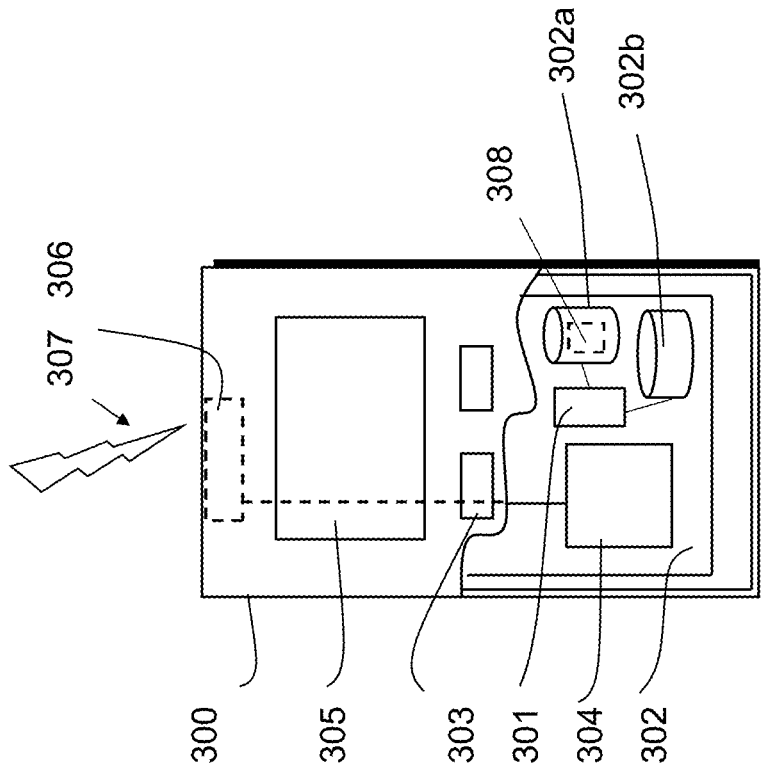
FIG. 3 shows a schematic representation of a terminal.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, a Cellular Internet of things (CIoT) device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 302a and the ROM 302a. The at least one processor 301 may be configured to execute an appropriate software code 308. The software code 308 may for example allow to perform one or more of the present aspects. The software code 308 may be stored in the ROM 302a.

The processor, storage and other relevant control apparatus may be provided on an appropriate circuit board and/or in chipsets. This feature is denoted by reference 304. The device may optionally have a user interface such as keypad 305, touch sensitive screen or pad, combinations thereof or the like. Optionally one or more of a display, a speaker and a microphone may be provided depending on the type of the device.

One or more of the following examples may be relevant to extended reality (XR). XR refers to all real-and-virtual combined environments and associated human-machine interactions generated by computer technology and wearables. It is an umbrella term that is used for different types of realities and typical use cases include, for example, augmented reality (AR), mixed reliability (MR), virtual reality (VR), and cloud gaming. It should be understood that even though one or more of the following examples reference XR traffic, other types of data traffic are equally applicable.

One element that is present for many XR applications is a high quality video transmission. Due to the large amount of data volume for video frames, different video compression algorithms on the sequence of captured images may be adopted to reduce the size of the video data being transmitted.

Video compression may be achieved through a mix of intra-frame and inter-frame coding. Intra-frame coding may use lossy encoding techniques that require only the information carried in the compressed frame for decoding. In contrast, inter-frame encoding may apply differential techniques on multiple frames to encode and transmit only the differences across consecutive frames. Frames generated using intra-frame encoding may be called I-frames, while those generated using inter-frame coding may be called P-frames or B-frames, depending on the used differential technique.

Inter-frame encoding may achieve higher compression at the cost of creating dependencies across frames. To limit the long dependencies and increase reliability against transmission losses, frames may be organized into a Group of Pictures (GoP). A GoP may comprise a sequence of consecutive frames starting with an I-frame followed by a certain number of P-frames and/or B-frames.

The outcome of a video compression may comprise up to three frame types:

I-frames (Intra-coded picture) may be generated based on a single captured image of the video stream. The achievable compression may be the lowest across the three frame types. This type of frame may not require other video frames for the decoding process.

P-frames (Predicted picture) may be generated using changes of the image with respect to the previous frame. It may achieve a higher compression ratio than I-frames but requires previous frames for the decoding.

B-frames (Bidirectional predicted picture) may use both previous and future frames as data reference for computing the changes that are encoded. B-frame may achieve the highest amount of data compression but also creates dependencies with past and future frames.

In some XR applications, B-frames may be avoided in order to limit dependencies across frames and speed up the decoding process at the receiver.

Figure 4:
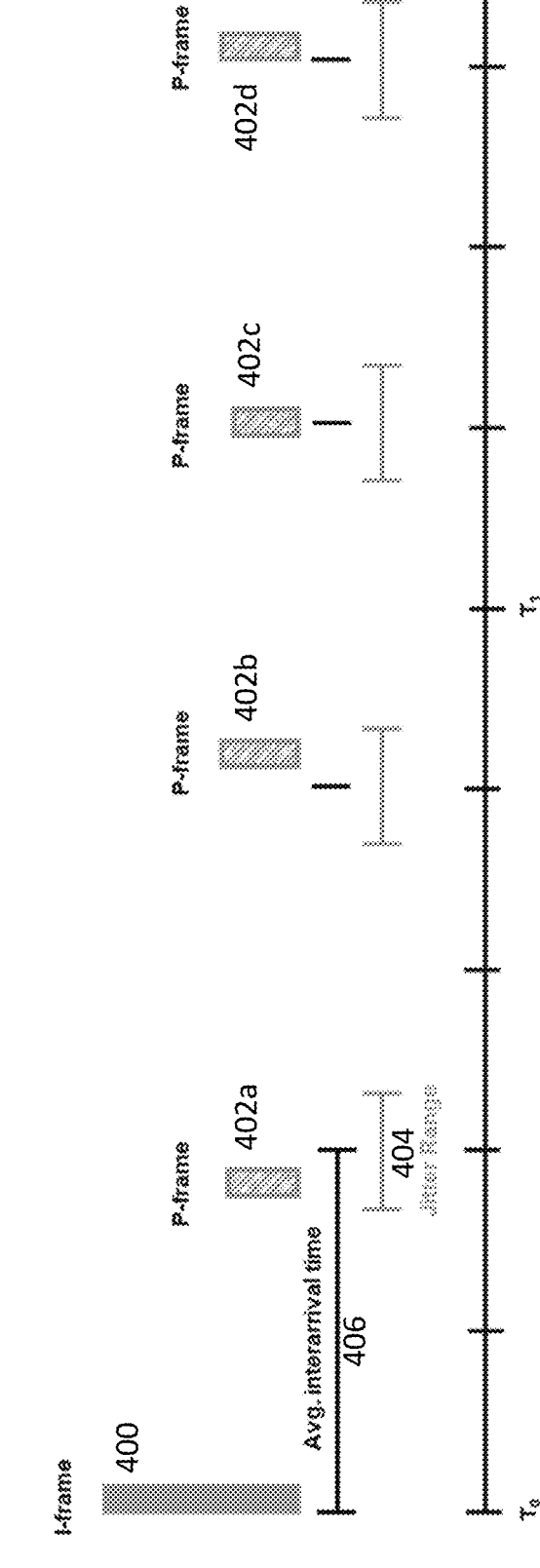
FIG. 4 shows a schematic example of group-of-pictures organization.

FIG. 4 shows a schematic example of GoP organization. The example of GoP organization comprises an I-frame 400 and four subsequent P-frames 402a-d. The example of GoP organization creates a "bursty" traffic pattern with a large burst due to the first I-frame of the GoP followed by a sequence of smaller bursts carrying P-frames as illustrated in FIG. 4.

FIG. 4 also illustrates, for each P-frame 402a-d, a jitter range 404. The jitter range 404 may also be referred to as packet delay variation. The jitter range 404 represents a range in time where the associated video frame (in the example of FIG. 4, a P-frame 402a-d) is expected to arrive at the decoder when transmitted. The average inter-arrival time 406 for each frame is also shown in FIG. 4.

3D video traffic of XR applications may show a certain deterministic periodicity. Therefore from a radio resource allocation point of view, it may be beneficial to apply configured resources scheduling (such as downlink (DL) semi-persistent scheduling (SPS) and/or uplink (UL) configured grant (CG)) to XR traffic transmission due the lower control signalling overhead and reduced end-to-end latency. SPS and CG are examples of scheduling configurations. The resources can be preconfigured according to the traffic characteristics like periodicity and expected arrival time derived from the quality of service (Qos) profile linked to the QoS flow identifier (QFI), i.e. QoS characteristics and parameters.

Semi-persistent scheduling (SPS) offers the advantage that it reduces the overhead as compared to sending DL dynamic scheduling grants (i.e., a reduced physical downlink control channel (PDCCH) overhead). In addition to the lower PDCCH overhead, use of SPS also helps to offload the computational burden from the busy dynamic gNB medium access control (MAC) scheduler. Several DL SPS enhancements were introduced in NR Rel-16, mainly with the purpose of supporting ultra-reliable low latency communication (URLLC) and time-sensitive communication (TSC) use cases with transmission of small payloads. Main characteristics of DL SPS include:

SPS is a method where DL radio resources for sending one transport block with a regular time-periodicity is configured for a UE.

Up to 8 simultaneous active SPS configurations can be configured for a UE (configured through RRC signalling).

Periodicity of any integer of a slot (N*14). Minimum periodicity in Rel-15 is 10 ms.

Separate configuration (RRC-based) and activation/deactivation (PDCCH addressed to CS-RNTI can either signal and activate the configured downlink assignment or deactivate it).

Therefore, SPS in its current form may not well suited for XR use cases.

3GPP working groups SA4 and RAN1 have adopted a quasi-periodic, multimodal and multi-class traffic model for XR applications. Specifically, XR traffic shows a "bursty" pattern with a high data rate and typically two burst types/classes that can be classified by their size. The traffic periodicity is due to the 3D video generation process that creates a sequence of frames at a given sampling rate. Typical examples of sampling rates are 30, 60, 90 and 120 frames per second (fps). Frames per second may also be measured as Hz (i.e. frequency). Compression techniques used to reduce the bitrate generates multiple types of frames that can be classified according to their size distribution. Inter-frame coding achieves higher compression (up to 5 and 10 times for P and B frames, respectively) at the cost of creating dependencies across frames. Therefore, compression generates a multimodal distribution for the frame size due to the superposition of different types of XR frames each with its own distribution. Finally, rate adaptation implemented at the application layer generates multiple classes of bursts. Specifically, the XR application dynamically adjusts the bitrate according to the status of the network and the user's viewport information (i.e., orientation of user's view). For example, an XR application reacts to the decrease of the end-to-end connection speed by reducing the quality of the 3D video stream. This results in the decrease of the 3D media content carried by all different frames. Table 1 below shows typical parameters of the distributions of frame size and interarrival time for full high-definition (FHD) and 4K qualities.

TABLE 1

Typical parameters of the distributions of frame size (multimodality) and interarrival time (periodicity) for FHD and 4K qualities (multi-classes). Frame rate is fixed at 60 frame per seconds, and therefore there is only one periodicity.

| Parameter | Proposed value (RAN1 #105 based on SA4) | |
| --- | --- | --- |
| | 30 Mbps (FHD) | 45 Mbps (4K) |
| Frame Rate | 60 fps | |
| Bitrate | 30 Mbps | 45 Mbps |
| Frame size (avg) | 62500 Bytes | 93750 Bytes |
| Frame size (std) | 6563 Bytes | 9844 Bytes |
| Frame size (max) | 93750 Bytes | 140625 Bytes |
| Frame size (min) | 31250 Bytes | 46875 Bytes |
| Interarrival (avg) | 16.67 ms | |
| Interarrival (std) | 2 ms | |
| Interarrival (max) | 20.67 ms | |
| Interarrival (min) | 12.67 ms | |

Figure 5:
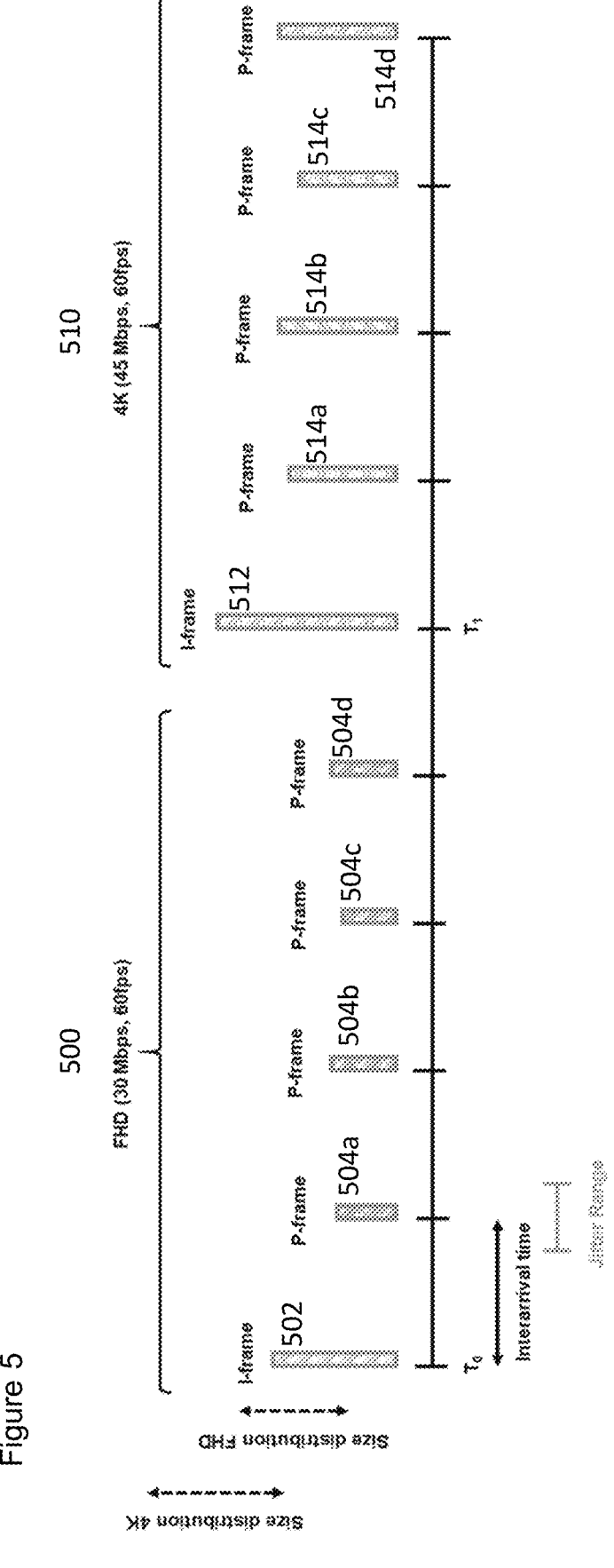
FIG. 5 shows an example of a typical traffic pattern for an XR video stream.

FIG. 5 shows an example of a typical traffic pattern for an XR video stream. In FIG. 5, two types of frames (multimodality) are generated at a certain frame rate (periodicity) and video quality (multi-class) by the XR application.

From time interval 'TO' to time interval 'T1', there is provided a full HD GoP 500. The FHD stream is 60 fps and 30 Mbps, in this example. The GoP 500 comprises an I-frame 502 and four subsequent P-frames 504a-d. The time between the arrival of the I-frame 502 and the first P-frame 504a is marked as the 'interarrival time'.

At time 'T1' the video stream is upscaled to 4K. At 'T1' there is provided a 4K GoP 510. The 4K stream is also 60 fps and 30 Mbps, in this example. The GoP 510 comprises an I-frame 512 and four subsequent P-frames 514a-d.

Due to the higher quality of the 4K stream, compared to the FHD stream, the size distribution of the 4K GoP 510 is greater than the FHD GoP 500. This is shown in FIG. 5 by the larger bars indicating the I-frames and P-frames.

The multiple combinations of frame rate (periodicity), quality (resolution) and frame type (compression) that can be used by the rate adaptation algorithm of an XR application makes it challenging to configure SPS and CG, for DL and UL transmissions respectively. For example, consider:

4 frame rates=1) 30 fps, 2) 60 fps, 3) 90 fps, 4) 120 fps

Two resolutions (qualities)=1) FHD, 2) 4K

Two frame types=1) I-frame, 2) P-frame

Figure 6:
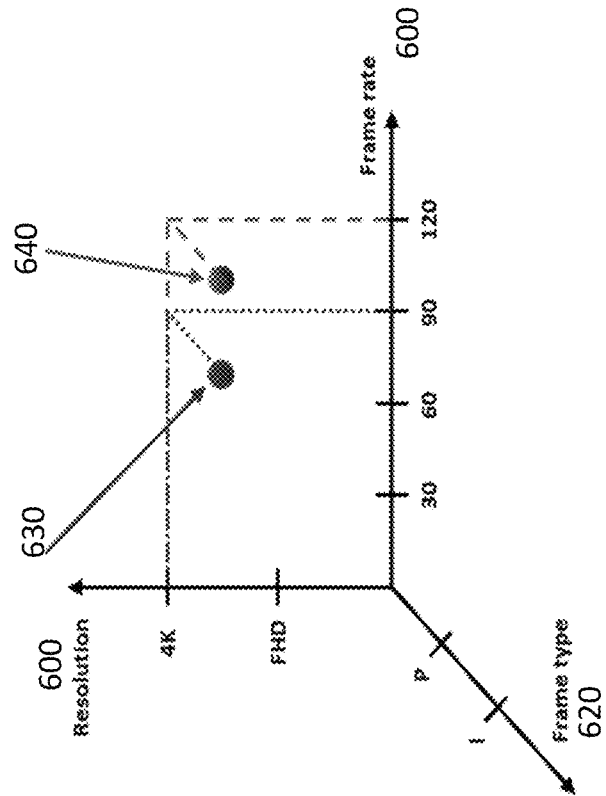
FIG. 6 shows a graphical example of SPS (or CG) configurations for different combinations of frame-rate, quality, and frame type.

Using the above example considerations, there are 16 possible combinations that may require 16 dedicated SPS configurations, as illustrated in FIG. 6. Further, when considering time-domain jitter variations and payload size variations, then even more combinations may be suitable.

FIG. 6 shows a graphical example of SPS (or CG) configurations for different combinations of frame-rate (periodicity), quality (class), and frame type (multimodality). There is provided an x-axis 600 which shows the frame rate. The y-axis shows the resolution 610. The z-axis 620 shows the frame type.

A first SPS configuration 630 is shown for 120 fps, 4K, I-frame. A second SPS configuration 640 is shown for 90 fps, 4K, I-frame. These SPS configurations are given as examples only. The first and second configurations 630, 640 show 2 of the 16 possible combinations.

As part of 3GPP Rel-17, there are provided up to 8 SPS configurations that can be defined. This is fewer than the 16 combinations identified above. Furthermore, SPS configurations may only be changed through a radio resource control (RRC) reconfiguration procedure, which makes the reconfiguration process fairly slow. In addition to the large number of SPS configurations needed for the <frame rate, resolution, frame type> combinations, jitter affects the frame arrival time. The jitter may result in early, or late, SPS/CG allocated radio resources.

Thus, it has bene identified that parameters of SPS and CG should be adjusted more flexibly to react to traffic changes of the adaptation and compression techniques used by XR applications.

Figure 7:
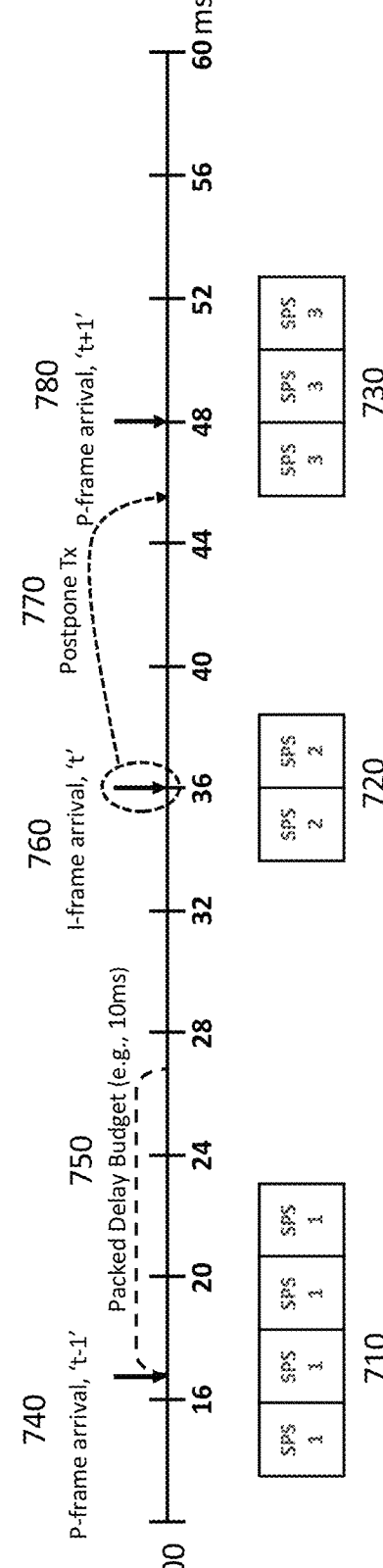
FIG. 7 shows an example of configured scheduling operation for XR traffic with different SPS configurations.

The problem above is illustrated in FIG. 7. FIG. 7 shows an example of configured scheduling operation for XR traffic with 3 different SPS 710, 720, 730 configurations which are enabled at three time instants. There is provided an x-axis 700 which shows the time in milliseconds. The timing shown in FIG. 7 is given as an example only. In this example, the three SPS configurations 710, 720, 730 are different.

Each SPS configuration has an activation time specified by a combination of subframe and slot numbers as well as a number of consecutive scheduling instants. In this way, the SPS configuration provides resources for the a UE/terminal to use. Each scheduling instant is composed of a set of frequency resources (i.e., PRB, Physical Resource Blocks).

In the example of FIG. 7 it is assumed that all SPS blocks have been assigned the same number of PRBs. Furthermore, in this example, it is assumed that an I-frame used two SPS blocks, and a P-frame uses one SPS block to be fully transmitted.

At a first time instance, 't–1' 740, the SPS configuration SPS1 710 is enabled, and a P-frame arrives. However, the SPS1 710 allocation is too large for a P-frame. This is because a P-frame uses one SPS block to be transmitted, while four SPS1 710 blocks are provided in FIG. 7 at 't–1'. The SPS1 710 allocation also starts too early with respect to the frame arrival. As seen in FIG. 7, the SPS1 configuration 710 blocks begin approximately 3 ms before the P-frame arrives. This may result in a wasting resources, since the first, second, and fourth blocks of the SPS1 710 cannot be used for data transmissions of other UEs.

There is also provided a packed delay budget, which is triggered by the arrival of a frame (either P-frame or I-frame). In this example, the packed delay budget is 10 ms.

At a second time instance, 't' 760, the SPS configuration SPS2 720 is enabled. However, the I-frame cannot be fully served as the SPS2 resources are not enough for the I-frame. This is because the I-frame uses two SPS blocks for transmission. Furthermore, SPS2 720 starts too early with respect to the frame arrival (approximately 2 ms in this example). Due to this, radio resources may be wasted since they cannot be reused to serve other users and the frame cannot be served within the delay budget. Therefore, in this example, the resources of SPS2 720 will all be wasted as the first block of SPS2 720 will remain unused, and the second block is not enough to transmit the I-frame before the packet delay budget.

At a third time instance, 't+1' 780, the SPS configuration SPS3 730 is enabled. The allocated resources fits the size of the P-frame, but the configured resources are started too early (approximately 2 ms in this example). Therefore the frame is fully served as the P-frame can use one block of SPS3 730. However, part of the SPS3 730 resources are wasted. In this example, the first and third SPS3 730 blocks are wasted since they cannot be used for the data transmission of other users.

One or more of the following examples aims to address one or more of the problems identified above. In examples, mechanisms are provided to expand the current SPS/CG framework to be more resource efficient for dynamic XR applications where various adaptations of, for example, the video codec rates and frame types are happening.

In one or more of the following examples, there is a dynamic adjusting of configured scheduling resources (i.e., SPS and CG configuration parameters) according to the combination of XR traffic properties like frame-rate, resolution, type of frames, that change over time. The dynamic adjusting may also take into account information about previous transmissions/receptions of data frames by the network, in order to determine whether an adjustment should take place. In examples, a number of machine learning (ML) schemes are used to learn the best SPS (or CG) configuration according to a class of XR traffic. In examples, there is provided an L1/L2 signalling scheme and UE behaviour scheme to enable the dynamic adjustment.

In examples, there is provided a ML scheme that learns and classifies combinations of traffic bursts, generated by XR applications, into multiple classes. Classes are abstractions for combinations of XR traffic parameters, such as for example, <frame rate, resolution, frame type>.

In examples, there is provided a ML scheme that predicts a class for received traffic based on traffic properties such as, for example, arrival rate, frame size distribution, and inter-arrival time.

In examples, there is provided a ML method to select the 'best' SPS (or CG) configuration according to the predicted class. The 'best' configuration may be the configuration that fulfils one or more QoS criteria of XR traffic (e.g., packet delay budget and packet error rate) and optimises system and/or user resources (e.g., radio resources, UE energy, etc.). This selection may also take into account the overall load in the cell and QoS requirements for the users in that cell.

In examples, there is provided an L1/L2 signalling mechanism which dynamically adjusts SPS/CG parameters. The adjustment may include, for example, the starting subframe/slot, periodicity and/or number of resources for SPS/CG configuration(s).

In examples, UE behaviour is configured to allow the UE to realign the SPS/CG configuration with the XR traffic according to the decision(s) made by the ML schemes implemented in the network.

These examples will be discussed in more detail below.

Figure 8:
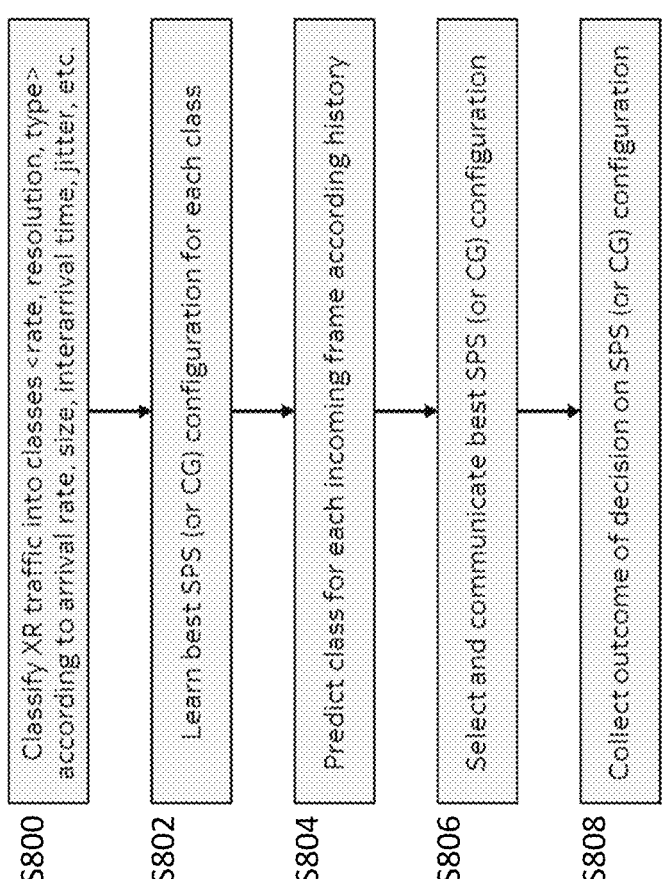
FIG. 8 shows an example method flow of steps performed by a network entity.

Example method steps performed a network entity/device are illustrated in FIG. 8. It should be one or more of the steps in FIG. 8 may be removed from the method flow, or performed in different orders.

In S800, the network entity classifies the data traffic into one or more classes. The data traffic may be XR data, in some examples. In other examples, the data traffic may be other suitable data. In examples, the classes may be based on data rate, resolution of the traffic, and type of traffic. The network entity may classify the traffic according to at least one of arrival rate, size, interarrival time, and jitter.

In S802, the network entity identifies/learns a SPS (or CG) configuration for each class determined in S800. The configuration may be determined as the most suitable for that class. The most suitable configuration may depend on what the network operator wants to achieve. In examples, the configuration may be most suitable according to a certain reward and/or utility model. Examples of the reward/utility model include: functions that capture user throughput, wasted resources, error probability, and/or power consumption according to the class parameters (e.g., frame-rate, resolution, frame-type). In examples, a ML service identifies/learns the SPS configuration for each class.

In S804, the network entity receives data traffic. The network entity predicts a class for each data frame in the traffic. The prediction may be based on previously received data traffic (i.e. history).

In S806, the network entity selects the 'best' (or most suitable) SPS (or CG) configuration. The network entity may communicate the selection of the configuration to a UE.

In S808, the network entity collects an outcome of a decision on the selected SPS (or CG) configuration. The outcome may depend on the reward/utility model used to select the most suitable SPS configuration. For example, if the objective of a network operator is to minimize the wasted resources, the reward/utility model can be represented as the inverse of the sum of the SPS resources that are not used for the transmission of the traffic of a class. In another example, if the objective is to maximize the reliability of data transmissions, then the reward/utility model can be represented as a function of all allocated SPS resources for a certain traffic class. In one example, collecting the outcome from the UE and evaluating the reward/utility model uses an analysis of the traffic with indications sent by the UE. Indications from the UE may include, for example, hybrid automatic request (HARQ) feedback, radio link control (RLC) feedback, and/or channel state information (CSI) reports. For example, a gNB computes the amount of dedicated SPS resources that are not used, as the difference between the SPS resources provided and the amount of UE data stored in a buffer wating for transmission. In another example, CSI reports combined with the amount of SPS resources provided are used to compute the first reliability measure for the transmission of a certain amount of data. The first reliability measure may be referred to as 'a priori', as it is determined without prior knowledge. In another example, HARQ and/or RLC feedbacks can be used to compute the second reliability measure of the transmitted data. The second reliability measure may be referred to as 'a posteriori', as it is determined with prior knowledge, gained through the feedback. The reward may then be computed as a function of at least one of the first and second reliabilities.

For the implementation of the first two operations (S800, S802), there are two possible implementation options: A) an online implementation, and B) an offline implementation.

For a first option (offline implementation): the network entity collects traffic statistics and the outcome of SPS/CG configurations. A clustering algorithm is executed on the collected i) traffic statistics and ii) SPS/CG configurations to create classes of XR traffic. The network then assigns, to each class, a SPS/CG configuration.

Known classification/clustering schemes like 'k-means' or Density-based spatial clustering of applications with noise ('DBScan') can be used for the classification and learning using the outcome of the SPS/CG configuration as a distance function. In other examples, other suitable clustering schemes are used. In examples, the type of clustering algorithm may be used for the definition of the XR traffic classes. The output of the clustering algorithm provides the traffic classes and the best SPS/CG configuration to be applied when the online traffic belongs to a certain traffic class. The online classification that takes as input the output of steps S800 and S802 and the online traffic to determine the most suitable class and SPS/CG configuration corresponds to the next three steps of FIG. 4 (S804, S806, S808).

For a second option (online implementation): one or more of the steps detailed in FIG. 4 are executed 'online'. In this example, the classification/clustering of the data traffic and the assignment of SPS/CG configurations are executed using an 'online' clustering algorithm. In some examples, S804, S806, and S808 are implemented using reinforcement learning algorithms. Examples of reinforcement learning algorithms include multi-armed bandits, and Q-learning. The outcome of the configuration is feedback to the online clustering algorithm to improve the classification of the traffic.

In some examples, steps S804, S806, and S808 of FIG. 4 are executed online. The implementation of these three steps in a case of offline clustering and learning (option A) corresponds to finding the closest match of the current traffic with the XR traffic classes. When the closest match is found, the network entity can select the assigned SPS/CG configuration.

When using an online clustering and learning (option B), the implementation of these three steps (S804, S806, and S808,) may be integrated with the first two (S800, S802) using a reinforcement learning scheme that learns, over time, the 'most suitable' traffic classification and SPS/CG configuration. The reinforcement learning scheme may use the outcome of the decision taken in the past, to make future selections and classifications.

In the above, 'offline' means that there is an offline training/learning phase to learn the most suitable SPS configuration for each class. During which, the decisions made by the network may not have any impact on the system/traffic performance. Once the most suitable SPS configuration has been computed, then during the online phase, the gNB uses the computed configuration for each class.

In above, 'online' means that the training/learning operations can be executed while the system is operated, and the data traffic is flowing. In the 'online' mode, the system/traffic performance may be affected while the training/learning is executed.

The first two steps, S800 and 802, may be performed either 'offline' or 'online'. When performed offline, S800 and S802 may build a 'table' where, for each class, there is one most suitable SPS configuration. The 'table' may be a database, or map, or any other suitable store of data, in other examples. The 'table' is then used by the next steps S804, S806, S808. Steps S804, S806, S808 may then be executed online. If the previous steps S800 and S802 are done offline, then the 'table' may be static, in that it will not be updated. Alternatively, the 'table' will be updated according to the collected outcome.

This will be discussed in more detail below.

Figure 9:
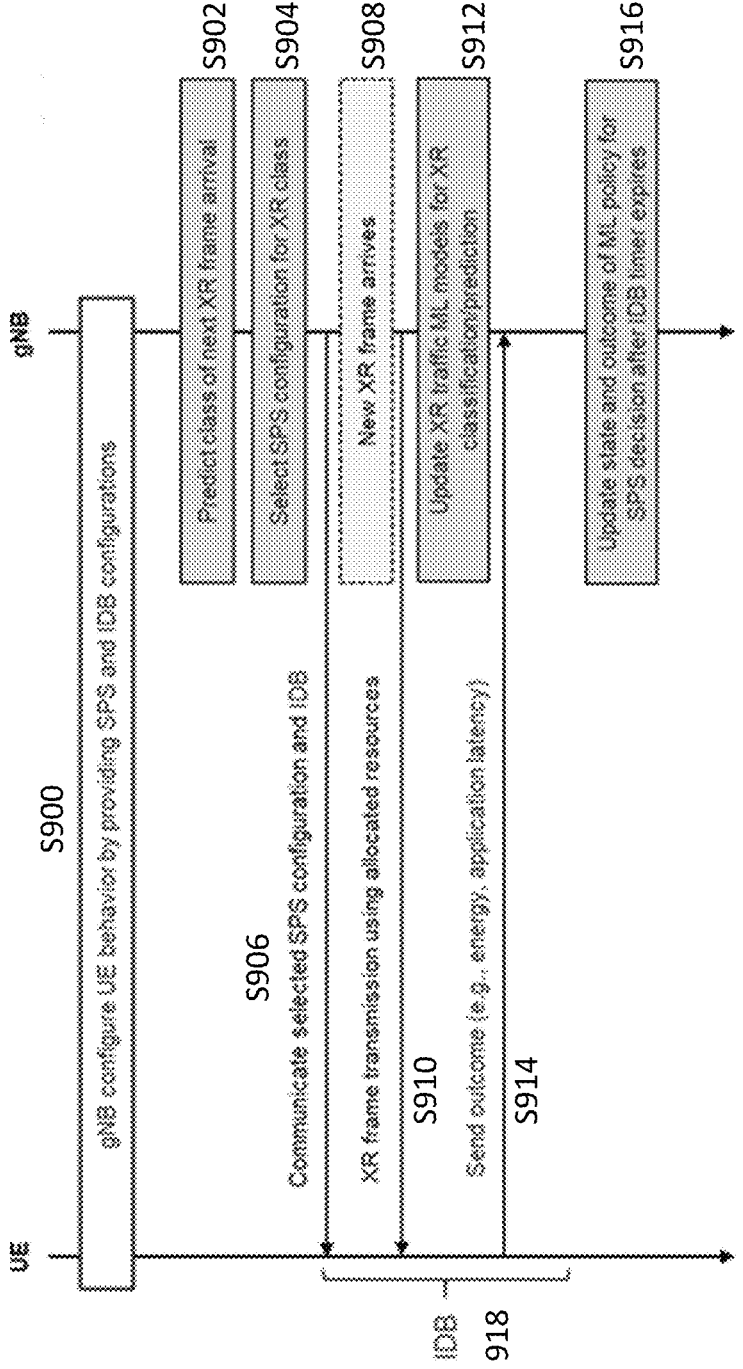
FIG. 9 shows an example signalling diagram between a network entity and a UE.

FIG. 9 shows an example signalling diagram between a network entity and a UE/terminal. The signalling in FIG. 9 is related to SPS (i.e. downlink). In this example, the network entity is a base station (gNB).

In S900, the gNB configures the UE behaviour for data traffic that is to be received. The gNB may provide one or more SPS configurations to the UE. The gNB may provide one or more IDB configurations to the UE. The IDB may be thought of a validity timer, as will be discussed in more detail below.

The data traffic may be XR data, in some examples. In other examples, the data traffic may be other suitable data.

The SPS configurations may comprise parameters that are adjustable. The parameters may be adjustable, by the network, using signalling. For example, the signalling may be DCI or MAC CE signalling. Examples of the parameters include an amount of resources, an amount of PRBs, a subframe start time, a subframe slot, and a periodicity.

In an example, when the UE connects to the gNB, the UE receives RRC signalling with SPS configurations with adjustable parameters and a plurality of IDBs for the transmission of UE feedback.

In S902, the gNB predicts a class for a next data frame to be received at the gNB. The data frame may be an XR frame. It is assumed that the gNB knows a plurality of different classes/groups that the data frame can be categorised in. The prediction may be performed by an ML model, configured at the gNB.

In S904, the gNB determines an SPS configuration for the predicted class. In some examples, the predicted class with already have an associated SPS configuration. In this case, the gNB will determine the SPS configuration associated with the predicted class. In some examples, the gNB performs a selection to determine an SPS configuration from the one or more SPS configurations. In other examples, the gNB will receive an indication of a selected SPS configuration, from another network entity.

In S906, the gNB provides the selected/determined SPS configuration to the UE. The gNB may also provide an associated IDB to the UE. The IDB may be associated with the selected/determined SPS configuration. As the SPS and IDB configurations have already been configured in S900, in S906 the gNB may be activating a configuration. In examples, the gNB may determine that the selected SPS configuration is not optimal for the class. In examples, the gNB may determine that the selected SPS configuration should be adjusted/changed using a reward/utility model. The reward/utility model uses information about previous transmissions of data frames by the network entity.

The information may comprise feedback from the UE. The feedback may indicate that too many or too little resources have been allocated, for example. The feedback may indicate that the allocated resources started a subframe too early or too late, for example. The feedback may indicate any suitable measure which allows the network to improve the SPS configurations at the UE.

The information about previous transmissions may allow the network to determine whether there are inefficiencies, or resources being wasted. When the gNB determines that the selected SPS configuration should be changed, the gNB may provide signalling to the UE which adjusts the parameters of the SPS configuration at the UE.

In S908, a data frame arrives at the gNB. The data frame may be an XR frame.

In S910, the gNB provides the data frame to the UE, using allocated resources. The allocated resources are part of the selected/determined SPS configuration.

In S912, following the reception of the data frame, the gNB updates the classes for the data traffic. In examples, the gNB uses the receives data frame to update the ML model for XR data classification.

In S914, the UE provides an outcome to the gNB. The outcome may be considered as feedback to the gNB. The outcome may comprise an energy amount spent by the UE to decode the frame. The outcome may comprise an application layer delay when application data units of the frame are fragmented into multiple packets (i.e. application latency).

In S916, the gNB uses the received outcome from the UE to update the ML model for SPS prediction. Step S916 may be performed after the IDB expires.

The IDB (918) is a time period which indicates the validity of the SPS configuration before the SPS configuration is updated. If the outcome/indication (S914) sent by the UE is received by the gNB after the IDB expires, then it is ignored by the gNB.

As shown in FIG. 9, when the UE connects to the gNB it receives the RRC configuration with adjustable SPS parameters and multiple Indication Delay Budgets (IDBs) for the transmission of UE feedback. The IDB is a set of parameters set by the gNB, each indicating a maximum validity time for the feedback provided by the user for a specific class of traffic. In some examples, multiple validity timers can be set depending on an XR framerate.

By having adjustable SPS parameters, this enables the fast reconfiguration of allocated resources in time and size using, for example, L1 or L2 signalling. L1/L2 signalling may include downlink control information (DCI), or a medium access control control element (MAC CE).

With different SPS parameters, the UE configuration can change the starting subframe and slot of the reserved resources. This may improve the reception at the UE when the jitter changes (an increase in frame rate corresponds in a decrease in jitter range). In this way, in examples, L1/L2 signalling includes parameters to change the starting subframe and slot in addition to periodicity and number of resources of SPS. This will be discussed in more detail below (with FIG. 11).

Figure 10:
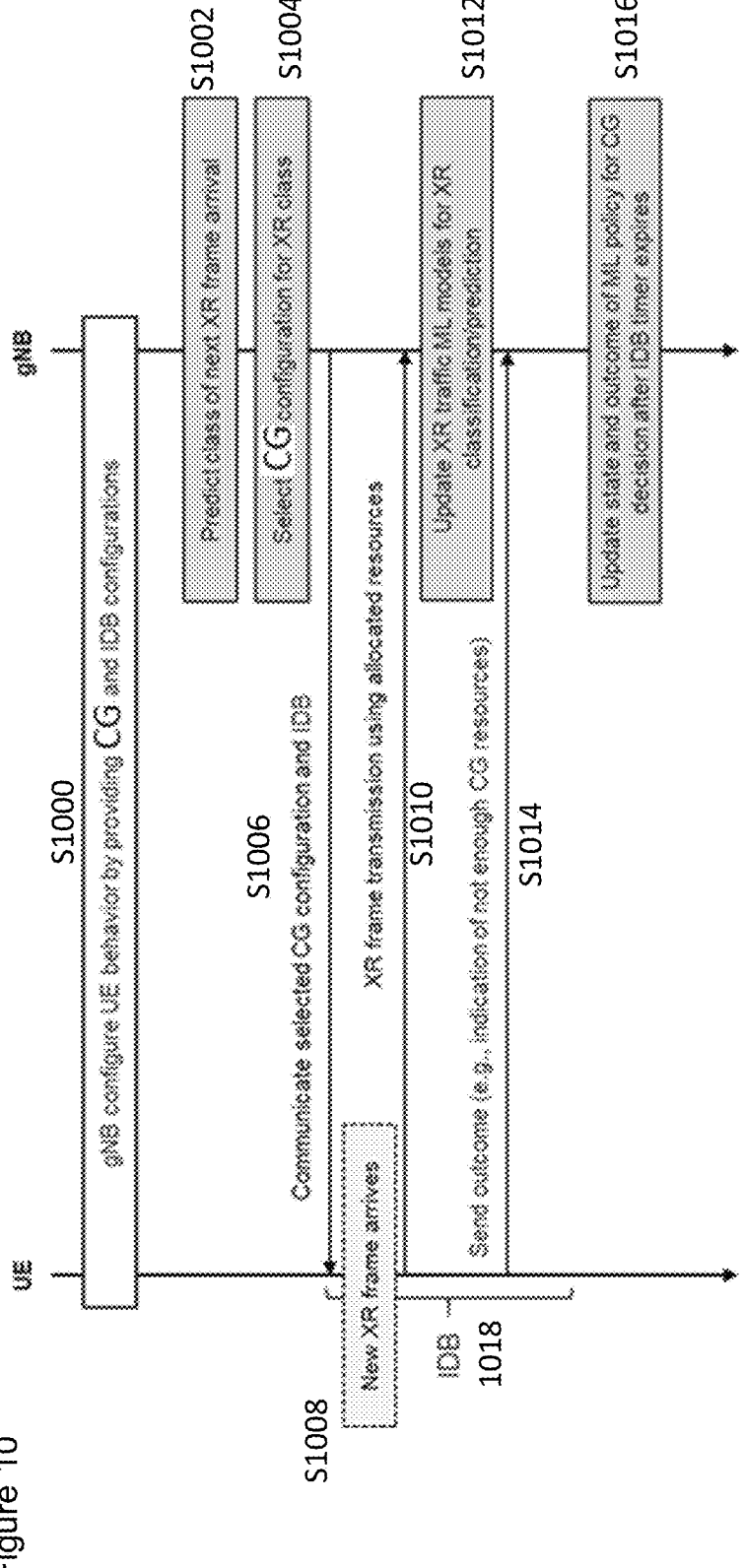
FIG. 10 shows another example signalling diagram between a network entity and a UE.

FIG. 10 shows an example signalling diagram between a network entity and a UE/terminal. The signalling in FIG. 10 is related to CG (i.e. uplink). In this example, the network entity is a base station (gNB).

In S1000, the gNB configures the UE behaviour for data traffic that is to be received. The gNB may provide one or more CG configurations to the UE. The gNB may provide one or more IDB configurations. The IDB may be thought of a validity timer, as will be discussed in more detail below.

The data traffic may be XR data, in some examples. In other examples, the data traffic may be other suitable data.

In an example, when the UE connects to the gNB, the UE receives RRC signalling with adjustable CG parameters and a plurality of IDBs for the transmission of UE feedback.

In S1002, the gNB predicts a class for a next data frame to be received at the UE. The data frame may be an XR frame. It is assumed that the gNB knows a plurality of different classes/groups that the data frame can be categorised in. The prediction may be performed by an ML model, configured at the gNB.

In S1004, the gNB determines an CG configuration for the predicted class. In some examples, the predicted class with already have an associated CG configuration. In this case, the gNB will determine the CG configuration associated with the predicted class. In some examples, the gNB performs a selection to determine a CG configuration from the one or more CG configurations. In other examples, the gNB will receive an indication of a selected CG configuration, from another network entity.

In S1006, the gNB provides the selected/determined CG configuration to the UE. The gNB may also provide an associated IDB to the UE. The IDB may be associated with the selected/determined CG configuration. The reception of the IDB configuration may start the IDB timer.

In examples, the gNB may determine that the selected CG configuration is not optimal for the class. In examples, the gNB may determine that the selected CG configuration should be adjusted/changed, using a reward/utility model. The reward/utility model uses information about previous receptions of data frames at the network entity.

The information may comprise feedback from the UE. The feedback may indicate that too many or too little resources have been allocated, for example. The feedback may indicate that the allocated resources started a subframe too early or too late, for example. The feedback may indicate any suitable measure which allows the network to improve the SPS configurations at the UE.

The information about previous receptions may allow the network to determine whether there are inefficiencies, or resources being wasted. When the gNB determines that the selected CG configuration should be changed, the gNB may provide signalling to the UE which adjusts the parameters of the CG configuration at the UE.

In S1008, a data frame arrives at the UE. The data frame may be an XR frame.

In S1010, the UE provides the data frame to the gNB, using allocated resources. The allocated resources are part of the selected/determined CG configuration.

In S1012, following the reception of the data frame, the gNB updates the classes for the data traffic. In examples, the gNB uses the receives data frame to update the ML model for XR data classification.

In S1014, the UE provides an outcome to the gNB. The outcome may be considered as feedback to the gNB. The outcome may comprise an indication of whether or not enough CG resources were provided to decode the received frame.

In S1016, the gNB uses the received outcome from the UE to update the ML model for CG prediction. Step S916 may be performed after the IDB expires.

The IDB (1018) is a time period which indicates the validity of the CG configuration before the CG configuration is updated. If the outcome/indication (S1014) sent by the UE is received by the gNB after the IDB expires, then it is ignored by the gNB.

As shown in FIGS. 9 and 10, an IDB represents a maximum delay for the UE to send its outcome/feedback to the gNB for a defined class of XR traffic. In an example, the UE feedback may represent the energy spent by the UE to decode the allocated radio resources or application layer delay when application data units are fragmented into multiple packets. The gNB may use this information to improve its ML model and adjust future predictions/reservations. The gNB may use this information to adjust the parameters of the SPS/CG configurations, configured at the UE. For example, if the feedback provided by the UE is negative, the gNB may make changes to alter the ML model and the assigned classes. In another example, if the feedback provided by the UE is positive, then the gNB may make little to no changes to the ML model.

In examples, a plurality of different IDBs are communicated to the UE by the gNB. This is because the maximum delay budget for feedback reporting depends on the XR class. Each SPS/CG configuration may have an associated IDB. For example, the IDB for 30 fps may be 4 time longer than the IDB for 120 fps.

As shown in S900 and S1000 of FIGS. 9 and 10 respectively, once the connection is configured between the UE and gNB, the gNB predicts the XR class of the next XR frame arrival and selects the appropriate SPS configuration for the XR class. The ML schemes used to classify and predict the XR class as well as the ML method that learn the best SPS configuration for each XR class are further described alongside FIGS. 12a and 12b.

As shown in S906 and S1006 of FIGS. 9 and 10 respectively, the gNB signals the SPS/CG selection and the corresponding IDB to the UE. In an example, the SPS selection may comprise signalling to adjust the parameters of the current/selected SPS configuration. In another example, the SPS selection may comprise an index to select a pre-configured SPS configuration. The UE adjust the SPS configuration and starts an IDB timer for feedback reporting according to the received configuration. The gNB also starts an IDB timer. It should be understood that these features are equally applicable to the uplink scenario for CG configurations.

As shown in S908 of FIG. 9, when the XR frame arrives, the gNB uses the reserved resources associated with the selected SPS configuration for the frame transmission. The received XR frame may also be used by the gNB to update the ML models for the classification and prediction of future XR traffic. The XR frame is used in a similar manner in the uplink scenario as shown in steps S1008 to S1012 of FIG. 10.

As shown in S914 and S1014 of FIGS. 9 and 10 respectively, once the DL transmission is completed, the UE sends the feedback to the gNB before the IDB time expires. The UE feedback may, for example, contain the resources that have been decoded.

As shown in S916 and S1016 of FIGS. 9 and 10 respectively, the gNB updates the ML model used to decide the best SPS configuration according to at least one of: i) the information collected during the transmission, ii) the network status, and iii) the UE feedback after the IDB timer expires.

Figure 11:
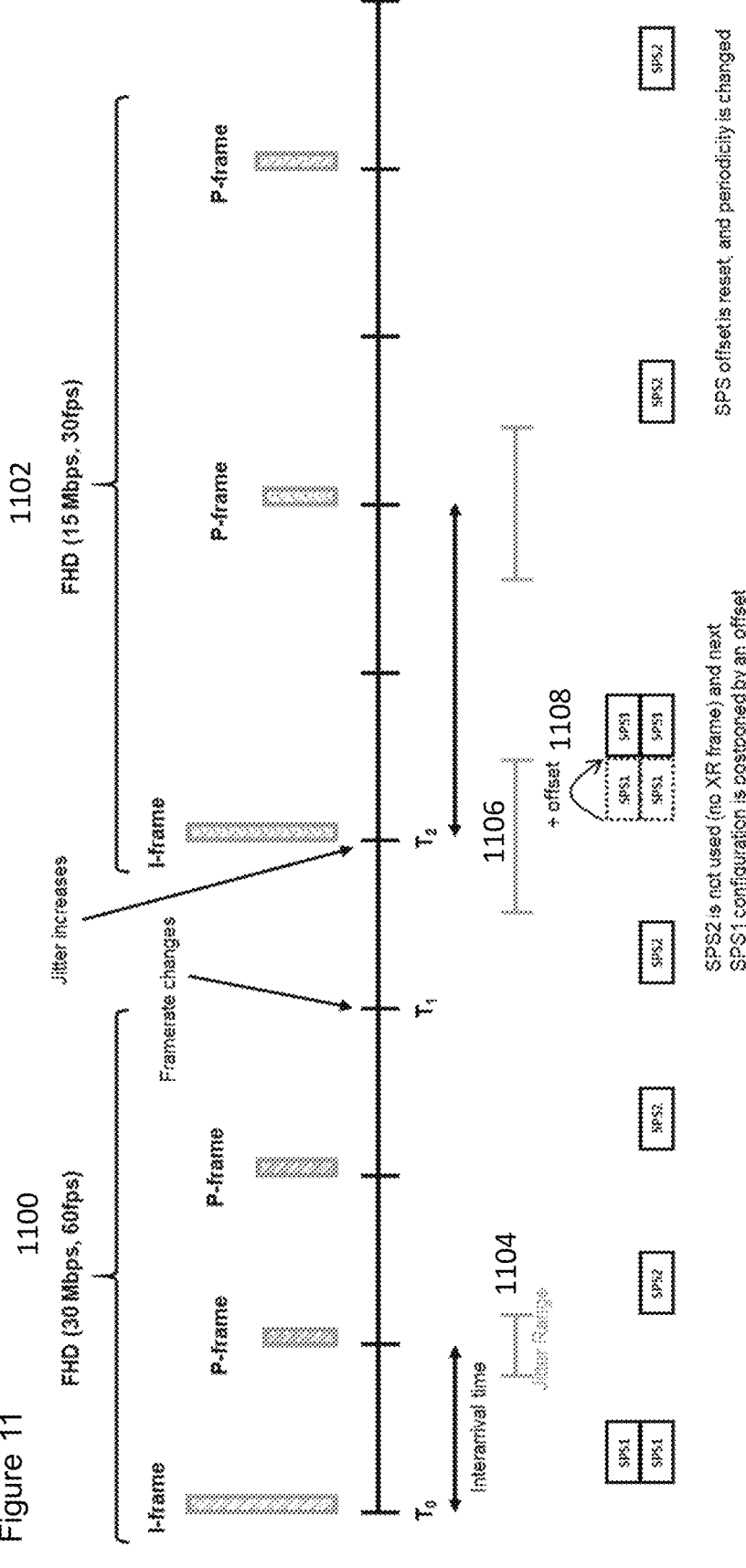
FIG. 11 shows a schematic example of XR frames being received over time.

FIG. 11 shows a schematic example of XR frames being received over time. FIG. 11 illustrates a misalignment of a SPS configuration which may be caused when a jitter range changes. The jitter range may change due to, for example, a change in frame rate.

At time TO, a first GoP 1100 is received. The first GoP 1100 comprises an I-frame followed by two P-frames. The first GoP 1100 is FHD, with 30 Mbps and 60 fps. A first jitter range 1104 is associated with the first GoP 1100.

At time T1, the XR application halves the frame rate. A halving of the frame rate may cause the jitter range for the GoP to double.

At T2, a second GoP 1102 is received. The second GoP 1102 comprises an I-frame followed by two P-frames. The second GoP 1102 is FHD, with 15 Mbps and 30 fps (i.e. half that of the first GoP 1100). A second jitter range 1106 is associated with the second GoP 1102. In this example, the second jitter range 1106 is double the range of the first jitter range 1104.

As the jitter has doubled following the frame rate halving, the reservation SPS1 is postponed at T2 by an offset time period 1108, in order to account for the larger jitter range 1106. If the larger jitter is not considered, then the SPS configuration (SPS1) may start too early if the frame arrives at the end of the jitter range. This would be inefficient for network resources. Therefore, an adjustment of the subframe/slot that the SPS configuration (i.e. resource reservation) starts at is performed.

The offset 1108 is communicated by a gNB to a UE at time T1. The offset 1108 may be communicated when the gNB detects a missing XR frame and the wasted SPS2 reservation. The SPS2 reservation is wasted as no I-frame was received at T1 (as the frame rate was changed).

The offset 1108 may be configured so that the SPS1 configuration starts at the end of the second jitter range 1106 of the second GoP 1102.

Once the XR traffic and SPS configurations have been realigned, the UE can change the starting subframe and slot to include the offset 1108. Also, the gNB can modify the periodicity of the SPS configuration, in line with the second GoP 1102.

The implementation of the realignment illustrated in FIG. 11 (i.e., adjustment of the starting subframe/slot of the SPS reservation) may lead to a modification of section 5.8.1 of TS 38.321 to include the adjustment performed autonomously by the UE based on the information provided by the gNB as follows:

After a downlink assignment is configured for SPS, the MAC entity shall consider sequentially that the Nth downlink assignment occurs in the slot for which:

(numberOfSlotsPerFrame×SFN+slot number in the
frame)=[(numberOfSlotsPerFrame×(SFNstart
time+SFNoffset)+slotstart time+slotoffset)+N×
periodicity×numberOfSlotsPerFrame/10]modulo
(1024×numberOfSlotsPerFrame)

where SFN is system frame number, and where SFNstart time and slotstart time are the SFN and slot, respectively, of the first transmission of PDSCH where the configured downlink assignment was (re-)initialised. SFNoffset and slotoffset are the offsets for SFN and slot, respectively, communicated by the gNB.

In an example, when there is an unaligned SFN across carriers in a cell group, the SFN of the concerned serving cell may be used to calculate the occurrences of configured downlink assignments.

In an example, SFNoffset and slotoffset can be included in SFNstart time and slotstart time, respectively, for the next assignment if the periodicity is modified by the gNB.

Figures 12A, 12B:
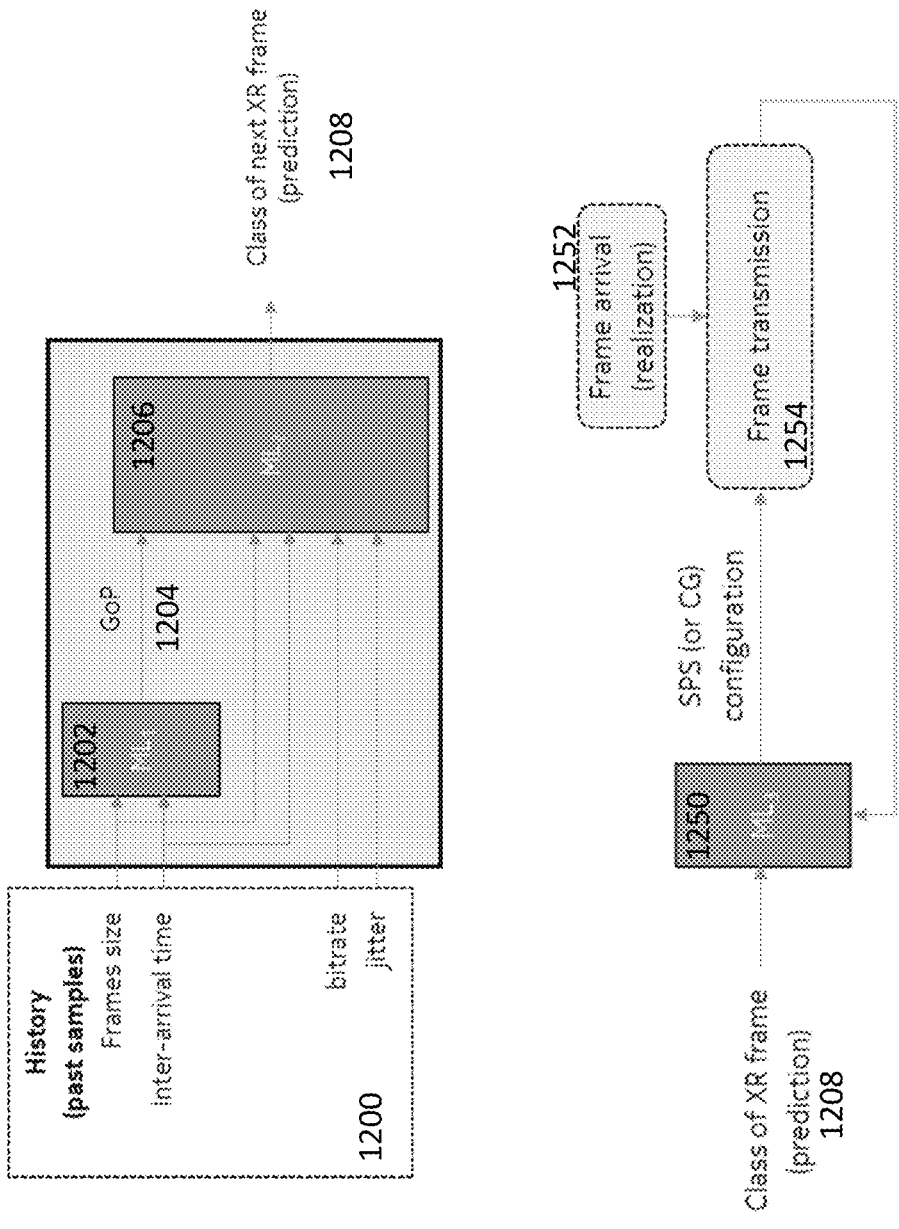
FIG. 12a shows a schematic example of ML models that are used to classify XR traffic.
FIG. 12b shows a schematic example of an ML model that is used to determine a configuration for XR traffic.

FIG. 12a shows a schematic example of ML models that are used to classify XR traffic. The classification of XR traffic translates XR traffic bursts/frames into a plurality of different classes or groups. Each class represents a combination of XR video parameters such as, for example, frame rate, video quality and type of frame. It should be understood that these parameters are used as examples only. In other examples, other suitable parameters are used to determine classes/groups.

The ML models may be used to create classes of XR traffic that have similar requirements in terms of radio resource allocation. The classes may group together data frames that have common requirements for radio resource allocation.

FIG. 12a illustrates the architecture of the ML models for the classification of future XR traffic.

The ML models use previously received samples/frames in order to determine/predict the class of future XR traffic. The previous received samples/frames may be referred to as historical data. The historical data 1200 may comprise at least one of frames size, inter-arrival time, bitrate and jitter.

A first ML model (ML1) 1202 estimates a GoP 1204 as a function of multiple past frame size and inter-arrival time samples. The output of ML1 1202 is the GoP 1204 estimation.

A second ML model (ML2) 1206 takes, as an input: frame size, inter-arrival time, bitrate, jitter, and the GoP 1204 from ML1. ML2 1206 uses these input to classify the XR traffic. The output 1208 from ML2 1206 is a class of XR frame for the next frame to be received (i.e. a prediction).

The ML1 1202 and ML2 1206 may be implemented by a gNB. In other examples, ML1 1202 and/or ML2 1206 are implemented by other network entities.

It should be understood that the classification scheme shown in FIG. 12a is given as an example only. Any suitable classification scheme could be used to create a plurality of classes/groups for the XR traffic, and/or to predict a class for XR traffic yet to be received. For example, a suitable neural network may be used wherein the loss function is the Kullback-Leibler divergence. In another example, clustering algorithms such as, for example, a density-based spatial clustering of applications with noise (DBSCAN) may be used. Using a DBSCAN algorithm may be particularly suitable if the classes are not known.

FIG. 12b shows a schematic example of architecture of a ML model to determine a suitable SPS (or CG) configuration. As shown in FIG. 12b, there is provided an ML model (ML3) 1250. ML3 1250 may be implemented by a gNB. In other examples, ML3 1250 is implemented by another network entity.

ML3 1250 takes, as an input: i) the output 1208 from FIG. 12a, and ii) the outcome of previous decisions. ML3 1250 uses these inputs to output the best (or most suitable) SPS/CG configuration.

As shown in FIG. 12b, the outcome of previous decisions is made up of received XR frames 1252, and the transmission of those received XR frames 1254 (similar to steps S908 and S910 of FIG. 9). ML3 1250 uses the received XR frames to determine whether the selection of the SPS/CG configurations are 'working', or if the ML model needs to be changed.

The ML3 1250 model solves the stochastic problem of selecting, for each XR class, the SPS configuration(s) that fulfils QoS requirements of XR traffic and minimizes wasted resources.

In one example, the gNB solves, using the ML models of FIGS. 12a and 12b the following stochastic problem:

$$\min_{\{R_u(t)\}} \limsup_{T\to\infty} \frac{1}{T} \sum_{t=1}^{T} \sum_{u\in U} E[e_u(t)] \tag{1}$$

$$\text{s.t. } \limsup_{T\to\infty} \frac{1}{T} \sum_{t=1}^{T} E[h_u(t)] \geq H_u \quad \forall\, u \in U \tag{2}$$

$$\sum_{u\in U} R_u(t) \leq R \quad t = 1, 2, \ldots, \tag{3}$$

wherein the function $e_u(t)$, which is defined for any user $u \in U$ (U is the set of all users served by the same gNB), corresponds to a user loss and evolves as follows:

$$e_u(t+1)=e_u(t)+f_u(R_u(t))$$

wherein $R_u(t)$ represents the SPS configuration for a user providing a certain transmission rate, while function $f_u(.)$ models the instantaneous user loss.

In an example, the function $f_u(.)$ represents the wasted radio resource for the SPS allocation used to serve the user $u \in U$ at a given time instant 't'. The function $e_u(t)$ therefore represents the cumulated loss for the user $u \in U$ up to time instant 't'.

In a further example, the function $f_u(.)$ represents the energy consumed by the user $u \in U$ at a given time instant 't', when using the SPS configuration $R_u(t)$. In the further example, the function $e_u(t)$ represents the cumulated consumed energy of user $u \in U$ up to time instant 't'.

The function $h_u(t)$ models the satisfaction of user $u \in U$ at time instant 't'. In examples, the function is defined as follows:

$$h_u(t) = \begin{cases} 1 & R_u(t) \geq S_u(t) \\ 0 & R_u(t) < S_u(t) \end{cases}$$

wherein $S_u(t)$ represents the amount of traffic that is to be served at time instant 't' for the user $u \in U$. The function $h_u(t)$ indicates whether the SPS configuration $R_u(t)$ contains enough resources to serve the traffic of the user $u \in U$, or not. R represents the amount of radio resources available for the SPS configuration at any time (i.e., R represents the maximum capacity of the system). In examples, R is considered fixed during the decision time. In other examples, it may be updated by the network if a bandwidth increases by allocating a larger bandwidth part or by aggregating multiple carriers. If the capacity of the system changes over time, the system may replace the right-hand side of constraint (3) with R (t) to indicate the dependency of the system capacity on the time instant.

This stochastic problem above is shown as an example only. In other examples, the gNB may solve one or more other suitable problems in order to fulfil QoS requirements of XR traffic and minimizes wasted resources.

One or more of the examples above allow for an improved radio resource allocation for XR use cases by introducing the dynamic configurations for the SPS/CG schemes. Furthermore, there are improved SPS/CG configurations to fulfil QoS requirements of XR services. Also, it enables faster updating of SPS/CG configurations. Lastly, there is an improved decision making with UE feedback/indications.

FIG. 13 shows an example method flow performed by an apparatus. In examples, the apparatus is comprised within a network entity. In examples, the network entity is a base station (gNB). In examples, the network entity is a core network entity.

At S1301, the method comprises classifying received data frames into a plurality of classes based on parameters of the received data frames.

At S1303, the method comprises determining a class from the plurality of classes for a next data frame based on the parameters of the previously received data frames, wherein the determination is performed before the next data frame has arrived.

At S1305, the method comprises determining a scheduling configuration from a plurality of scheduling configurations based on the determined class of the next data frame, wherein each of the plurality of scheduling configurations comprises at least one parameter.

At S1307, the method comprises adjusting the at least one parameter of the selected scheduling configuration based on i) the determined class of the next data frame, and ii) information about previous communications of data frames by the network entity.

At S1309, the method comprises activating the selected scheduling configuration in the terminal with the at least one adjusted parameter, such that the terminal adjusts the at least one parameter of the selected configuration in the terminal.

FIG. 14 shows an example method flow performed by an apparatus. In examples, the apparatus is comprised within a UE. In examples, the apparatus is comprised within a terminal.

At S1401, the method comprises receiving a configuration from a network entity with a plurality of scheduling configurations, wherein each of the plurality of scheduling configurations comprises at least one parameter.

At S1403, the method comprises receiving, from the network entity, signalling that activates a selected scheduling configuration of the plurality of scheduling configurations, with the at least one parameter that has been adjusted.

At S1405, the method comprises changing the configuration of the selected scheduling configuration using the at least one adjusted parameter.

FIG. 15 shows a schematic representation of non-volatile memory media 1500a (e.g. computer disc (CD) or digital versatile disc (DVD)) and 1500b (e.g. universal serial bus (USB) memory stick) storing instructions and/or parameters 1502 which when executed by a processor allow the processor to perform one or more of the steps of the methods of FIG. 13 and FIG. 14.

It is noted that while the above describes example embodiments, there are several variations and modifications which may be made to the disclosed solution without departing from the scope of the present invention.

The examples may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples.

Alternatively, or additionally some examples may be implemented using circuitry. The circuitry may be configured to perform one or more of the functions and/or method steps previously described. That circuitry may be provided in the base station and/or in the UE/terminal/communications device.

As used in this application, the term "circuitry" may refer to one or more or all of the following: (a) hardware-only circuit implementations (such as implementations in only analogue and/or digital circuitry); (b) combinations of hardware circuits and software, such as: (i) a combination of analogue and/or digital hardware circuit(s) with software/firmware and (ii) any portions of hardware processor(s) with software (including digital signal processor(s)), software, and memory (ies) that work together to cause an apparatus, such as the communications device or base station to perform the various functions previously described; and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus for a network entity, the apparatus comprising:

at least one processor; and at least one memory storing computer program code that, when executed by the at least one processor, causes the apparatus to perform:

classifying received data frames into a plurality of classes based on parameters of the received data frames;

determining a class from the plurality of classes for a next data frame based on the parameters of the previously received data frames, wherein the determination is performed before the next data frame has arrived;

determining a scheduling configuration from a plurality of scheduling configurations based on the determined class of the next data frame, wherein each of the plurality of scheduling configurations comprises at least one parameter;

adjusting the at least one parameter of the selected scheduling configuration based on i) the determined class of the next data frame, and ii) information about previous communications of data frames by the network entity, wherein the at least one parameter is adjusted to change at least one of: a starting subframe of the resources associated with the selected scheduling configuration, a periodicity of the selected scheduling configuration, and a number of resources associated with the selected scheduling configuration;

activating the selected scheduling configuration in the terminal with the at least one adjusted parameter, such that the terminal adjusts the at least one parameter of the selected configuration in the terminal;

associating each of the plurality of classes with a scheduling configuration of the plurality of scheduling configurations;

providing, to the terminal, a plurality of indication delay budgets, each indication delay budget indicating a maximum validity timer for feedback on an outcome of the selected scheduling configuration, being used by the terminal, according to a scheduling criteria to be provided by the terminal to the network entity;

determining a missing data frame at the network entity; and providing a timing offset, to the terminal, to change the starting subframe of a next set of resources associated with the selected scheduling configuration.

2. The apparatus according to claim 1, wherein the received data frames are classified into the plurality classes so that the data frames in each class have similar requirements for resource allocation, using the parameters of the received data frames.

3. The apparatus according to claim 1, wherein the at least one memory and computer program, with the at least one processor, further cause the apparatus to perform:

receiving the next data frame at the network entity;

providing the next data frame to the terminal using allocated resources associated with the selected scheduling configuration; and receiving the next data frame, from the terminal, using allocated resources associated with the selected scheduling configuration.

4. The apparatus according to claim 3, wherein the at least one memory and computer program code, with the at least one processor, further cause the apparatus to perform:

receiving, from the terminal, feedback associated with the transmission or reception of the next data frame at the terminal;

determining that the selected scheduling configuration associated with the determined class should be adjusted based on the received feedback; and adjusting the parameters of the selected scheduling configuration at the terminal based on the received feedback.

5. An apparatus for a terminal, the apparatus comprising:

at least one processor; and at least one memory storing computer program code that, when executed by the at least one processor, cause the apparatus to perform:

receiving a configuration from a network entity with a plurality of scheduling configurations, wherein each of the plurality of scheduling configurations comprise parameters that are adjustable, wherein the at least one parameter is configured to be adjusted to change at least one of: a starting subframe of the resources associated with the selected scheduling configuration, a periodicity of the selected scheduling configuration, and a number of resources associated with the selected scheduling configuration;

receiving, from the network entity, signalling that activates a selected scheduling configuration of the plurality of scheduling configurations, with adjusted parameters;

changing the configuration of the selected scheduling configuration using the adjusted parameters;

providing, to the terminal, a plurality of indication delay budgets, each indication delay budget indicating a maximum validity timer for feedback on an outcome of the selected scheduling configuration, being used by the terminal, according to a scheduling criteria to be provided by the terminal to the network entity;

determining a missing data frame at the network entity; and providing a timing offset, to the terminal, to change the starting subframe of a next set of resources associated with the selected scheduling configuration.

6. The apparatus according to claim 5, wherein the at least one memory and computer program code, with the at least one processor, further cause the apparatus to perform:

transmitting, to the network entity, feedback associated with the reception or transmission of the next data frame using the resources associated with the selected scheduling configuration.

7. A method performed by a network entity, the method comprising:

classifying received data frames into a plurality of classes based on parameters of the received data frames;

determining a class from the plurality of classes for a next data frame based on the parameters of the previously received data frames, wherein the determination is performed before the next data frame has arrived;

determining a scheduling configuration from a plurality of scheduling configurations based on the determined class of the next data frame, wherein each of the plurality of scheduling configurations comprises at least one parameter, wherein the scheduling configuration comprises one of: a semi-persistent scheduling configuration, and a configured-grant configuration;

adjusting the at least one parameter of the selected scheduling configuration based on i) the determined class of the next data frame, and ii) information about previous communications of data frames by the network entity, wherein the at least one parameter is adjusted to change at least one of: a starting subframe of the resources associated with the selected scheduling configuration, a periodicity of the selected scheduling configuration, and a number of resources associated with the selected scheduling configuration;

activating the selected scheduling configuration in the terminal with the at least one adjusted parameter, such that the terminal adjusts the at least one parameter of the selected configuration in the terminal;

associating each of the plurality of classes with a scheduling configuration of the plurality of scheduling configurations;

providing, to the terminal, a plurality of indication delay budgets, each indication delay budget indicating a maximum validity timer for feedback on an outcome of the selected scheduling configuration, being used by the terminal, according to a scheduling criteria to be provided by the terminal to the network entity;

determining a missing data frame at the network entity; and providing a timing offset, to the terminal, to change the starting subframe of a next set of resources associated with the selected scheduling configuration.

8. The method according to claim 7, the method comprising:

receiving, from the terminal, feedback associated with transmission or reception of the next data frame at the terminal using the resources associated with the selected scheduling configuration.

9. The method according to claim 8, the method comprising:

determining that the selected scheduling configuration associated with the determined class should be adjusted based on the received feedback; and adjusting the parameters of the selected scheduling configuration at the terminal based on the received feedback.

10. The method according to claim 7, wherein the scheduling configuration is determined so that the scheduling configuration fulfils at least one quality of service criteria associated with extended reality data frames.

11. A non-transitory computer-readable medium having computer program code encoded thereon, the computer program code comprising computer executable instructions which, when run on one or more processors, cause the one or more processors to perform the method of claim 7.

12. A method performed by a terminal, the method comprising:

receiving a configuration from a network entity with a plurality of scheduling configurations, wherein each of the plurality of scheduling configurations comprises at least one parameter;

receiving, from the network entity, signalling that activates a selected scheduling configuration of the plurality of scheduling configurations, with the at least one parameter that has been adjusted, wherein the at least one parameter has been adjusted to change at least one of: a starting subframe of the resources associated with the selected scheduling configuration, a periodicity of the selected scheduling configuration, and a number of resources associated with the selected scheduling configuration;

changing the configuration of the selected scheduling configuration using the at least one adjusted parameter;

providing, to the terminal, a plurality of indication delay budgets, each indication delay budget indicating a maximum validity timer for feedback on an outcome of the selected scheduling configuration, being used by the terminal, according to a scheduling criteria to be provided by the terminal to the network entity;

determining a missing data frame at the network entity; and providing a timing offset, to the terminal, to change the starting subframe of a next set of resources associated with the selected scheduling configuration.

13. The method according to claim 12, the method comprising:

transmitting, to the network entity, feedback associated with reception or transmission of the next data frame using the resources associated with the selected scheduling configuration.

14. A non-transitory computer-readable medium having computer program code encoded thereon, the computer program code comprising computer executable instructions which, when run on one or more processors, cause the one or more processors to perform the method of claim 12.

* * * * *